(12) United States Patent
Fuda

(10) Patent No.: US 10,539,405 B2
(45) Date of Patent: Jan. 21, 2020

(54) JIG OF SPIRIT LEVEL CLAMPING AID TOOLS, SQUARES AND HAND CLAMPS

(71) Applicant: Cosimo Fuda, Toronto (CA)

(72) Inventor: Cosimo Fuda, Toronto (CA)

(*) Notice: Subject to any disclaimer, the term of this patent is extended or adjusted under 35 U.S.C. 154(b) by 63 days.

(21) Appl. No.: 15/390,281

(22) Filed: Dec. 23, 2016

(65) Prior Publication Data
US 2017/0284784 A1   Oct. 5, 2017

Related U.S. Application Data

(60) Provisional application No. 62/387,212, filed on Dec. 24, 2015.

(51) Int. Cl.

| | | |
|---|---|---|
| B43L 7/00 | (2006.01) |
| B43L 7/02 | (2006.01) |
| B43L 7/10 | (2006.01) |
| G01B 3/04 | (2006.01) |
| G01B 3/56 | (2006.01) |
| G01C 9/26 | (2006.01) |
| G01C 9/28 | (2006.01) |
| B25B 5/04 | (2006.01) |
| B25B 11/00 | (2006.01) |

(Continued)

(52) U.S. Cl.
CPC .............. *G01B 3/566* (2013.01); *B23K 31/02* (2013.01); *B23K 37/0435* (2013.01); *B23K 37/0443* (2013.01); *B23K 37/0533* (2013.01); *B25B 5/003* (2013.01); *B25B 5/006* (2013.01); *B25B 5/06* (2013.01); *B25B 5/163* (2013.01); *B25B 7/123* (2013.01); *B25B 11/002* (2013.01); *B25H 1/10* (2013.01); *B25H 7/00* (2013.01); *B25H 7/02* (2013.01); *B43L 7/00* (2013.01); *B43L 7/10* (2013.01); *B43L 7/14* (2013.01); *G01B 3/04* (2013.01); *G01B 3/563* (2013.01); *G01B 5/0004* (2013.01); *G01C 9/26* (2013.01); *G01C 9/28* (2013.01); *B23K 2101/06* (2018.08); *B25B 5/04* (2013.01)

(58) Field of Classification Search
CPC ............ B23K 37/0435; B23K 37/0417; B23K 37/0443; B23K 37/053; B43L 7/14; B23B 2247/18; G01B 3/563
See application file for complete search history.

(56) References Cited

U.S. PATENT DOCUMENTS

| | | |
|---|---|---|
| 288,807 A | 11/1883 | Hodges |
| 1,036,601 A | 8/1912 | Frank, Sr. |

(Continued)

FOREIGN PATENT DOCUMENTS

| | | | | |
|---|---|---|---|---|
| GB | 18892 | | 1/1900 | |
| GB | 20886 | | 1/1900 | |
| GB | 2248505 A | * | 4/1992 | ............. B23Q 9/005 |

OTHER PUBLICATIONS

CIPO, Examination Report, dated Apr. 20, 2018, re Canadian Patent Application No. 2952515.

*Primary Examiner* — Daniel J Colilla

(57) ABSTRACT

One or more clamping aid tools for mounting to various squares and straight edges, including carpenter squares, framing squares, speed squares or the like, and various straight edges and rulers for easily and accurately positioning various objects, either flat and/or round, magnetic or not. The clamping aid tools can secure these squares and straight edges to various objects while they are being fitted, secured and/or welded together.

48 Claims, 20 Drawing Sheets

(51) Int. Cl.

| | | |
|---|---|---|
| *B43L 7/14* | (2006.01) | |
| *B25H 7/00* | (2006.01) | |
| *B23K 37/04* | (2006.01) | |
| *B23K 37/053* | (2006.01) | |
| *B25H 1/10* | (2006.01) | |
| *B25H 7/02* | (2006.01) | |
| *B23K 31/02* | (2006.01) | |
| *B25B 5/00* | (2006.01) | |
| *B25B 5/06* | (2006.01) | |
| *B25B 5/16* | (2006.01) | |
| *B25B 7/12* | (2006.01) | |
| *G01B 5/00* | (2006.01) | |
| *B23K 101/06* | (2006.01) | |

(56) References Cited

U.S. PATENT DOCUMENTS

| | | |
|---|---|---|
| 1,102,689 A | 7/1914 | Sargent |
| 1,476,611 A * | 12/1923 | Hines ............ B23B 47/281 269/129 |
| 2,246,260 A | 8/1938 | McGrath |
| 2,386,833 A * | 10/1945 | Baldwin ............ G01C 9/24 33/369 |
| 2,526,852 A | 10/1950 | Collon |
| 2,761,215 A | 9/1956 | Macklenburg |
| 2,789,363 A | 4/1957 | Miley |
| 2,745,183 A | 5/1958 | Queen |
| 3,213,545 A | 10/1965 | Wright |
| 3,273,246 A | 9/1966 | Siberini |
| 3,311,988 A * | 4/1967 | Manville ............ G01C 9/24 33/342 |
| 3,518,768 A | 7/1970 | Quenot |
| 3,832,782 A | 9/1974 | Johnson et al. |
| D233,695 S | 11/1974 | Payne |
| 4,003,134 A | 1/1977 | Adams |
| 4,028,814 A | 6/1977 | Andrews |
| 4,060,902 A | 12/1977 | Keller |
| 4,194,295 A * | 3/1980 | Simuro ............ G01B 3/06 33/451 |
| 4,200,990 A | 5/1980 | West |
| 4,344,215 A | 8/1982 | Dearman |
| 4,348,815 A | 9/1982 | Hurt |
| 4,394,801 A | 7/1983 | Thibodeaux |
| 4,526,833 A | 7/1985 | Patterson |
| 4,593,475 A | 6/1986 | Mayes |
| 4,635,377 A * | 1/1987 | Park ............ G01C 9/28 33/381 |
| D290,092 S | 6/1987 | Bies |
| 4,673,174 A | 6/1987 | Tabbert |
| 4,697,351 A * | 10/1987 | Hopfer ............ B25H 7/02 33/420 |
| 4,745,689 A | 5/1988 | Hiltz |
| 4,757,615 A | 7/1988 | Cecil |
| 4,773,163 A | 9/1988 | Wolford, Jr. |
| 4,850,254 A | 7/1989 | Burney |
| 4,876,798 A | 10/1989 | Zimmerman |
| 4,928,395 A | 5/1990 | Good |
| 4,955,144 A | 9/1990 | Lienard et al. |
| 4,966,141 A | 9/1990 | Welch |
| 5,103,569 A | 4/1992 | Leatherwood |
| 5,170,568 A | 12/1992 | Wright |
| 5,187,877 A | 2/1993 | Jory et al. |
| 5,189,804 A | 3/1993 | Ostachowski |
| 5,199,177 A | 4/1993 | Hutchins et al. |
| 5,276,973 A | 1/1994 | Rakauskas |
| 5,339,530 A | 8/1994 | Wright |
| 5,384,967 A | 1/1995 | Helmuth |
| 5,433,011 A | 7/1995 | Scarborough et al. |
| 5,459,935 A * | 10/1995 | Paulson ............ G01B 3/566 33/451 |
| D364,574 S | 11/1995 | Utz et al. |
| 5,561,911 A * | 10/1996 | Martin ............ G01C 15/008 33/290 |
| 5,574,074 A | 11/1996 | Zushi et al. |
| 5,586,395 A | 12/1996 | Malczewski |
| 5,675,201 A | 10/1997 | Young |
| 5,971,379 A | 10/1999 | Leon, Jr. |
| 6,000,686 A | 12/1999 | Yates |
| 6,314,652 B1 | 11/2001 | English |
| 6,543,144 B1 * | 4/2003 | Morin ............ G01B 3/02 33/27.032 |
| 6,662,460 B2 | 12/2003 | Evans |
| 6,742,271 B1 | 6/2004 | Rushing |
| 6,820,345 B2 | 11/2004 | Evans |
| 7,117,606 B2 * | 10/2006 | Brown ............ G01C 9/28 33/365 |
| 7,178,252 B1 * | 2/2007 | Belgard ............ B23K 37/0533 33/412 |
| 7,343,688 B2 * | 3/2008 | Price ............ B25H 7/00 33/418 |
| 7,398,601 B2 | 7/2008 | Morrell |
| 7,591,076 B2 | 9/2009 | Varnedoe |
| 7,854,070 B1 | 12/2010 | Vajentic |
| 9,234,751 B2 * | 1/2016 | Silberberg ............ G01C 9/28 |
| 2007/0245581 A1 * | 10/2007 | Hios ............ B43L 7/10 33/429 |
| 2007/0271802 A1 | 11/2007 | Tran et al. |
| 2009/0038168 A1 * | 2/2009 | Wixey ............ B43L 7/10 33/471 |
| 2009/0064516 A1 | 3/2009 | Diaz et al. |
| 2013/0091717 A1 | 4/2013 | Steele et al. |
| 2014/0373373 A1 | 12/2014 | Hershkovich |

\* cited by examiner

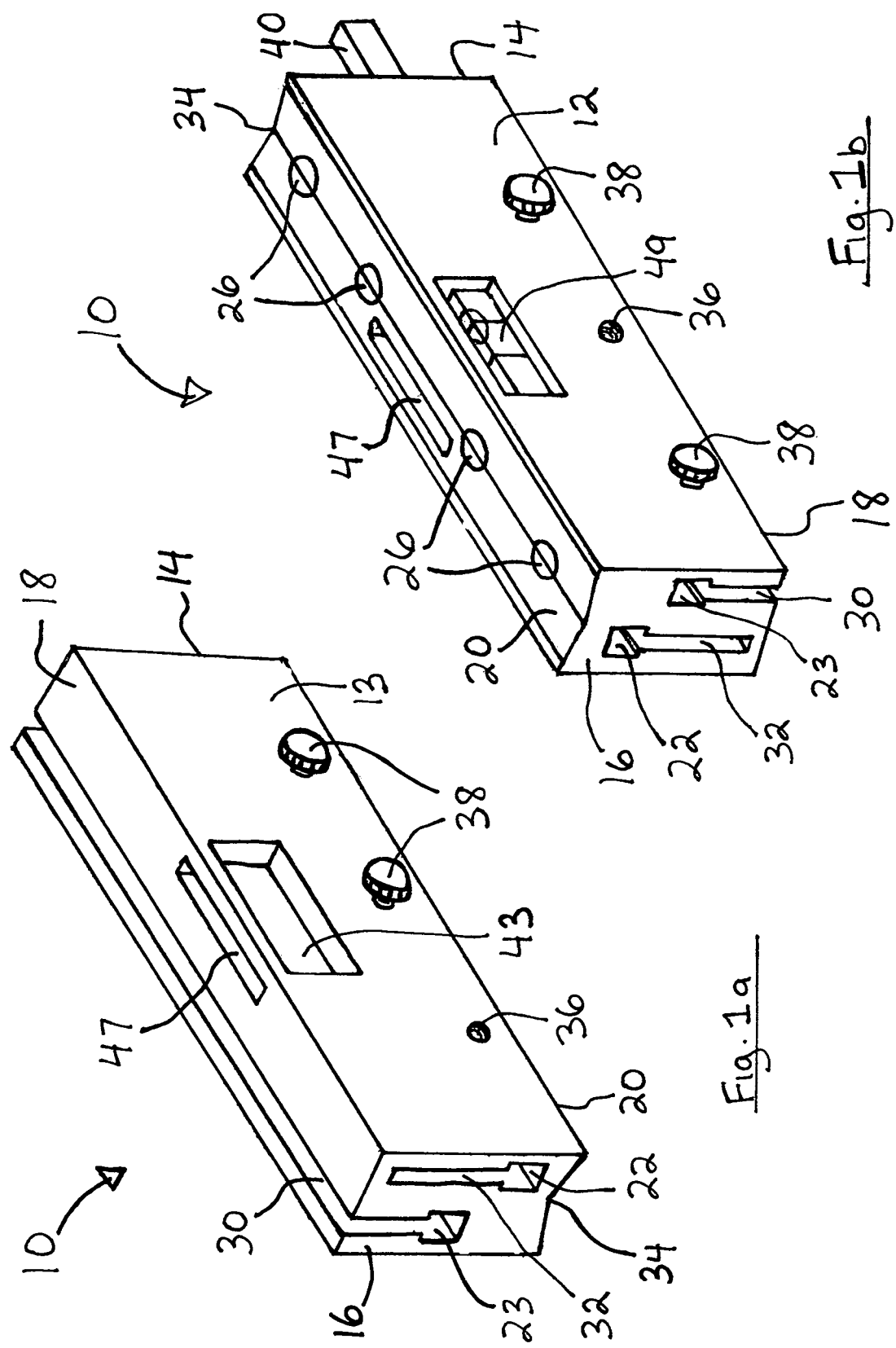

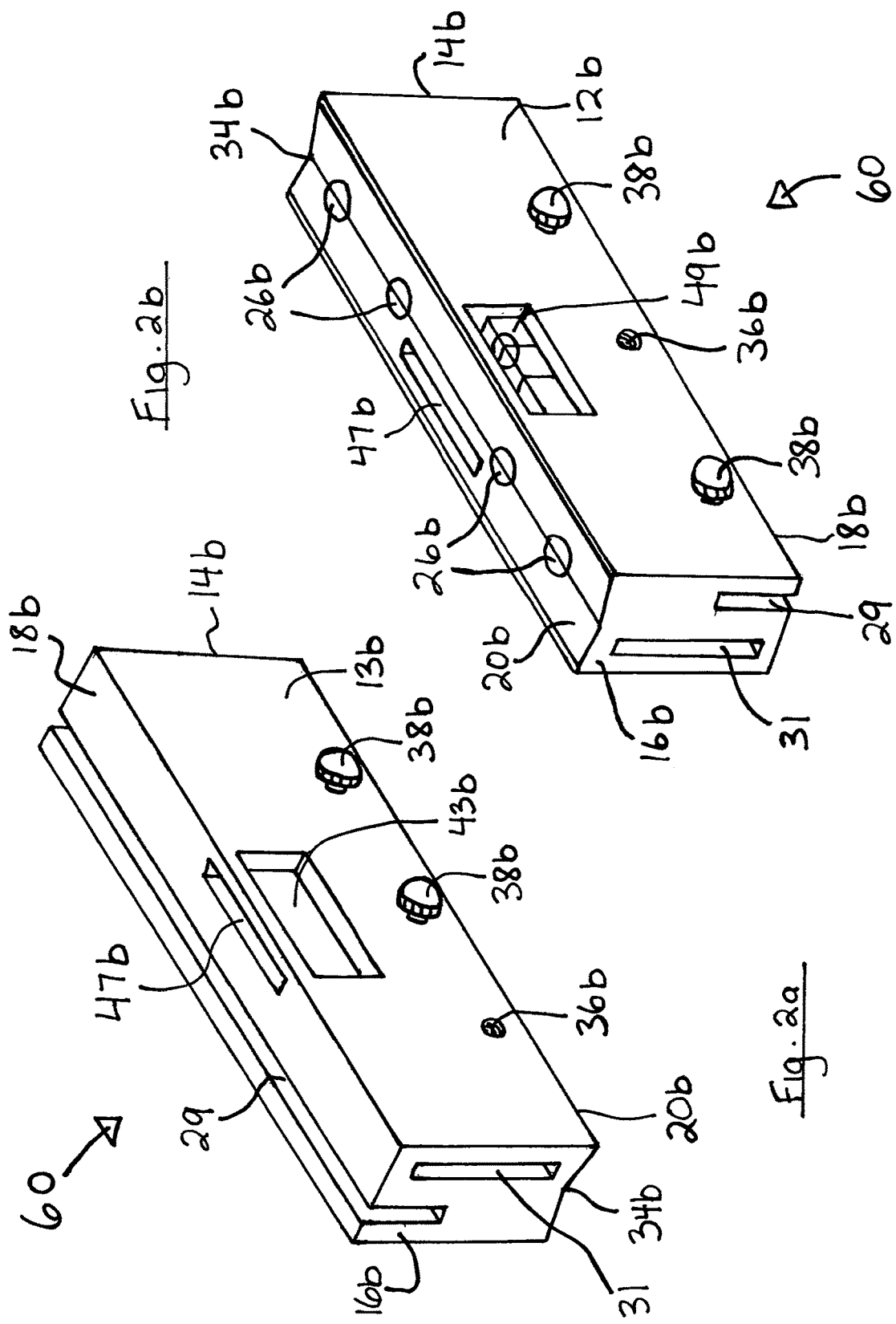

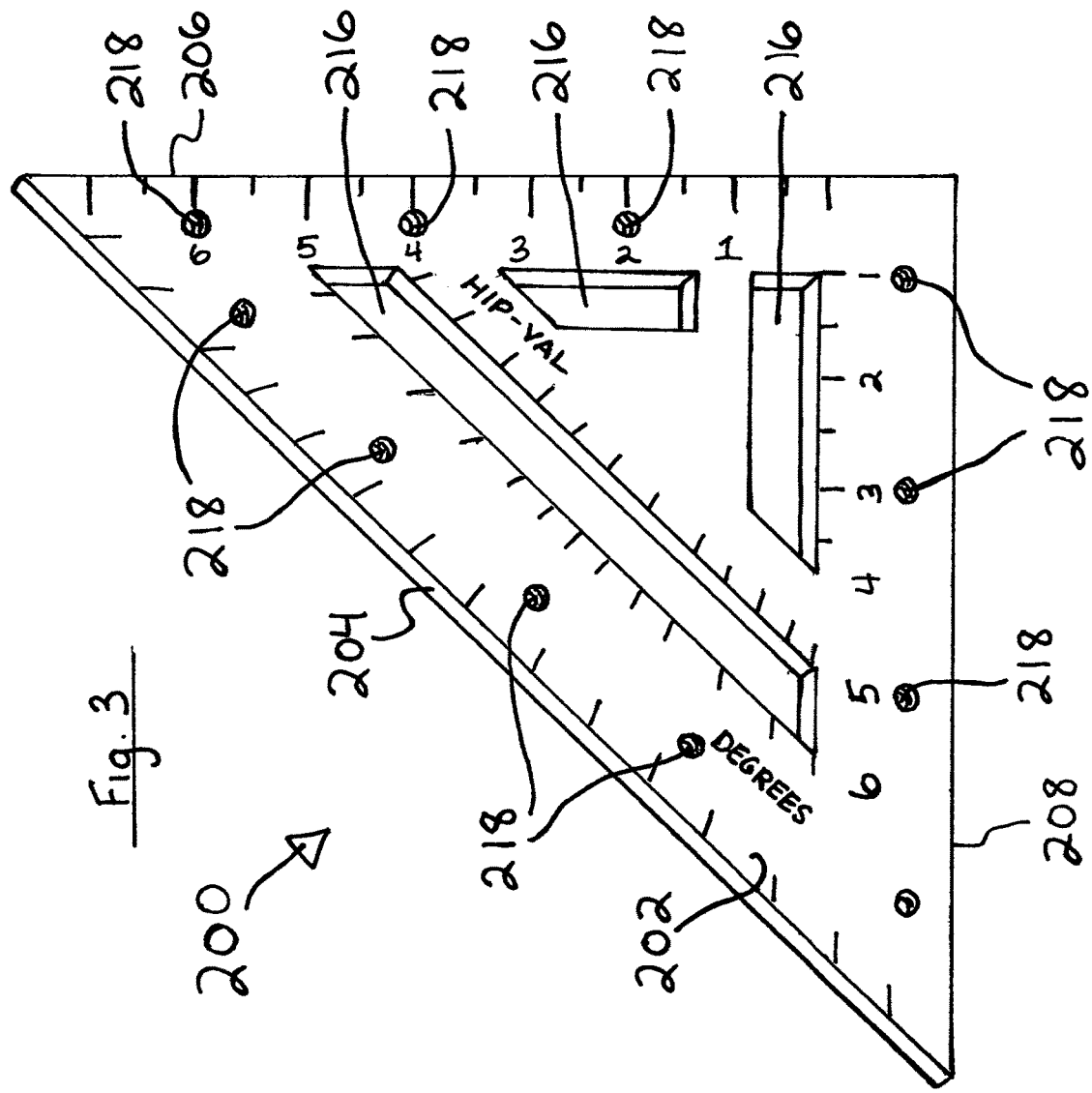

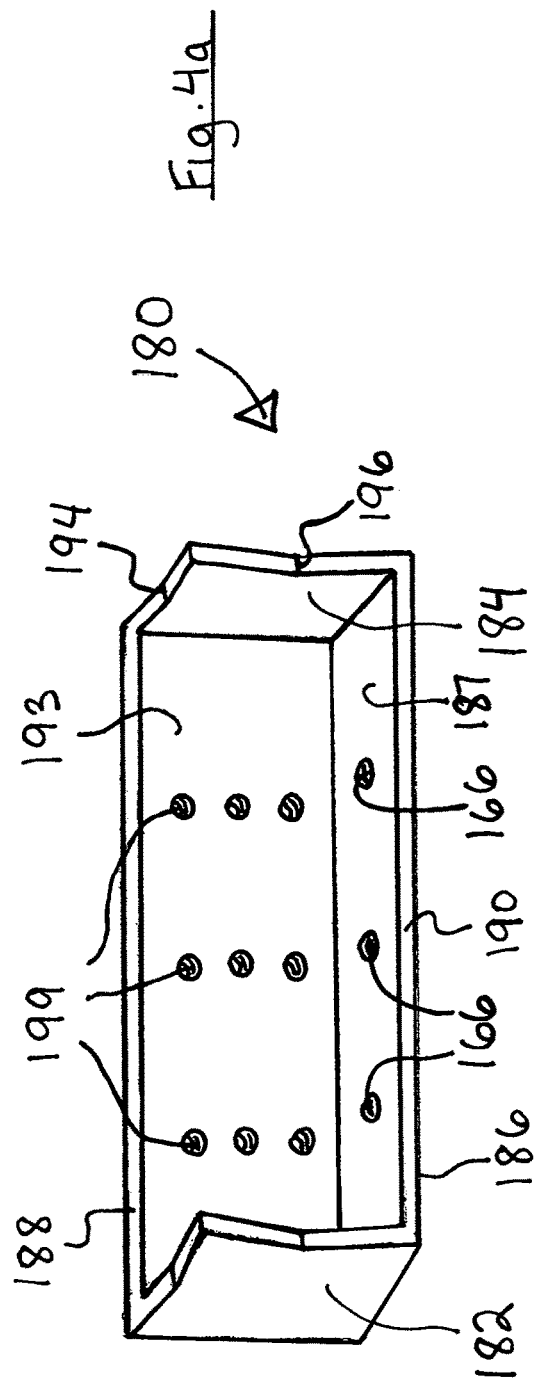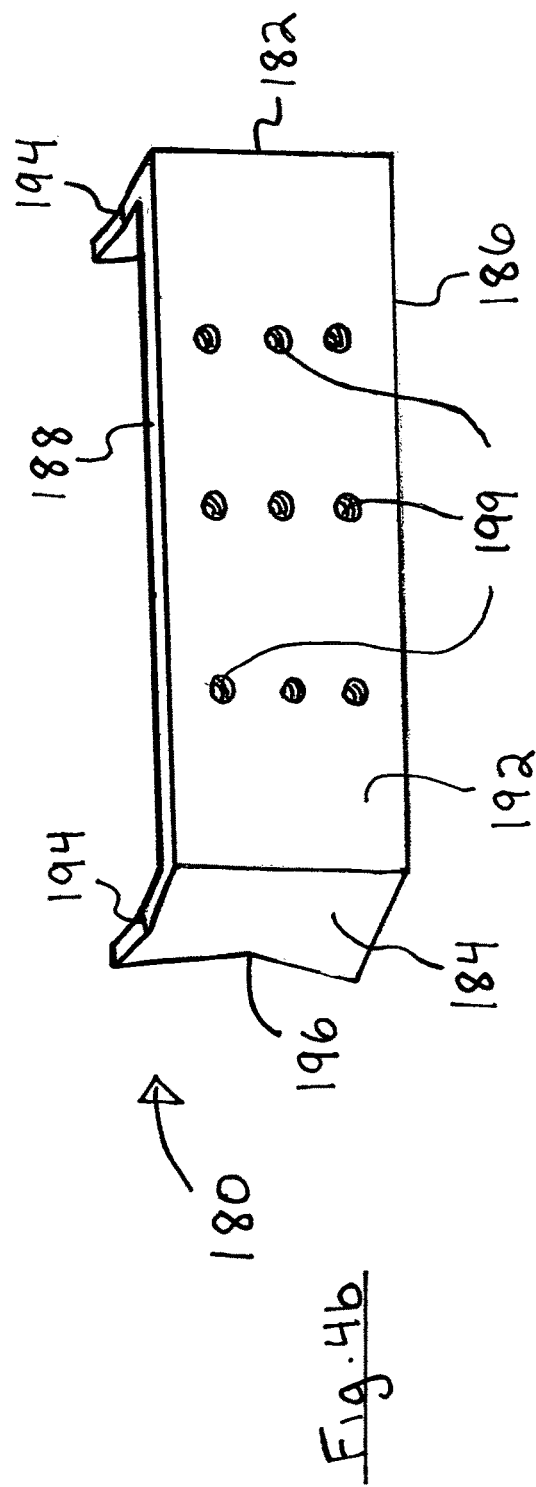

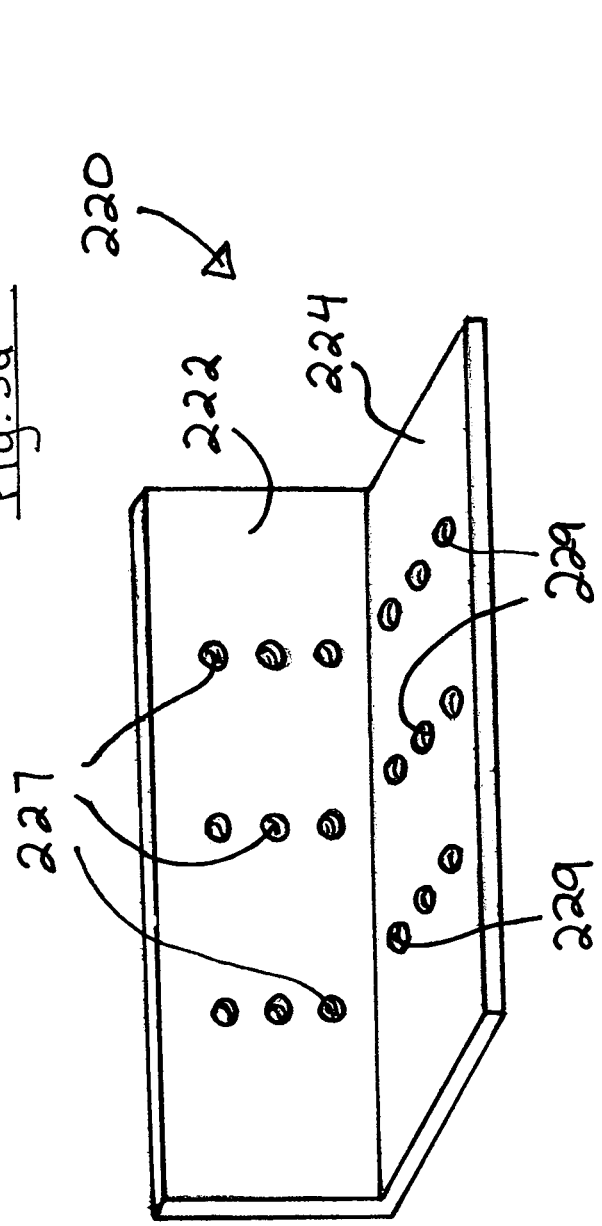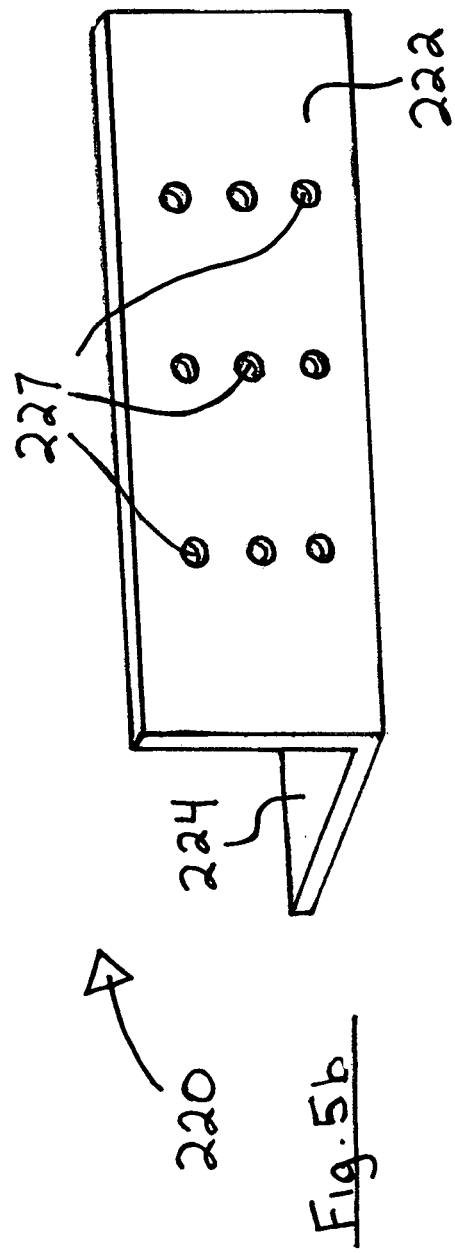

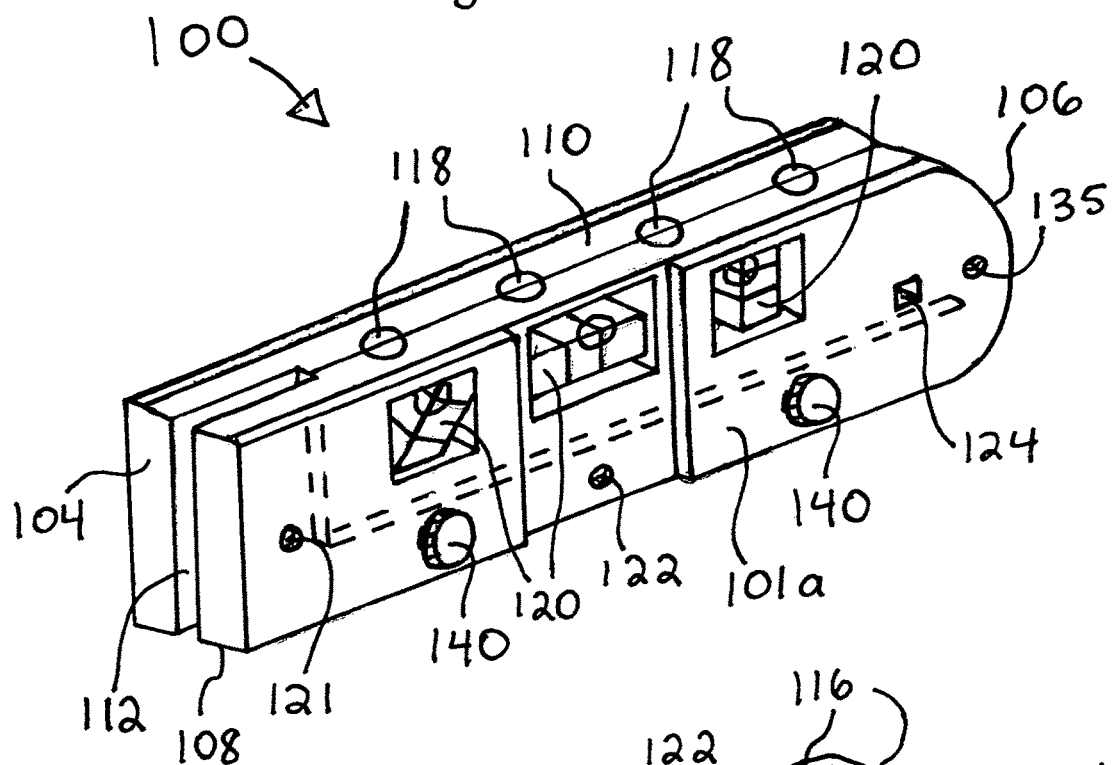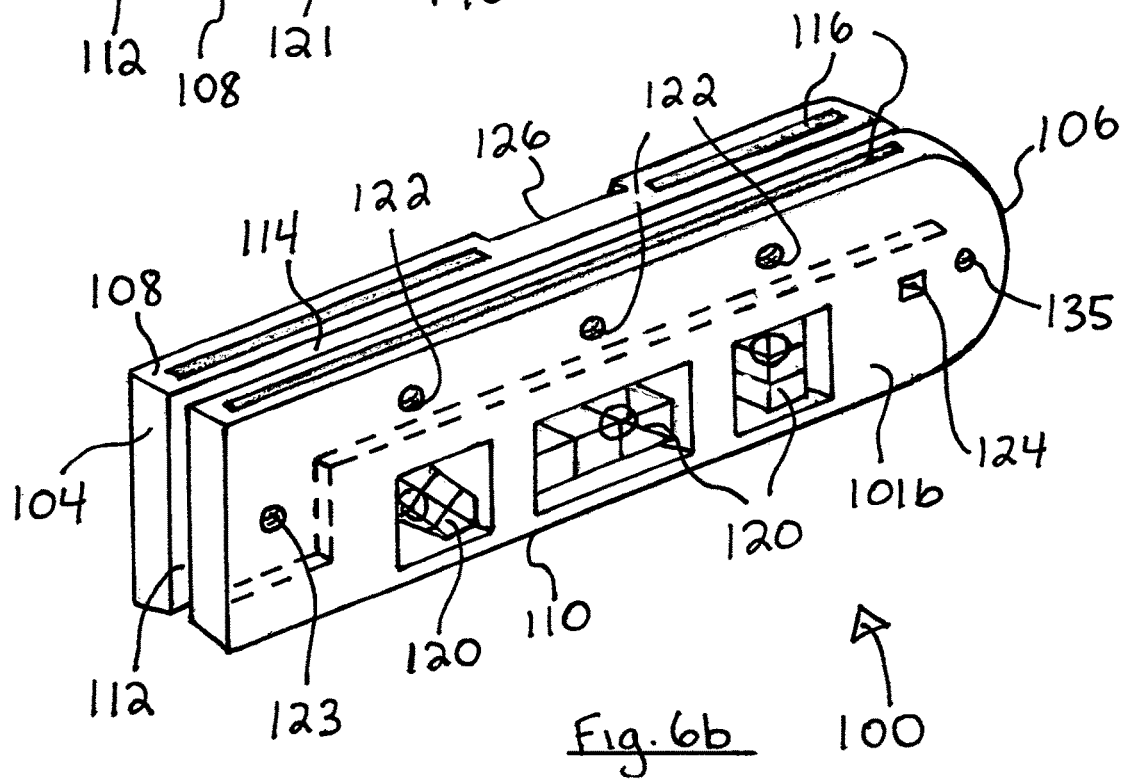

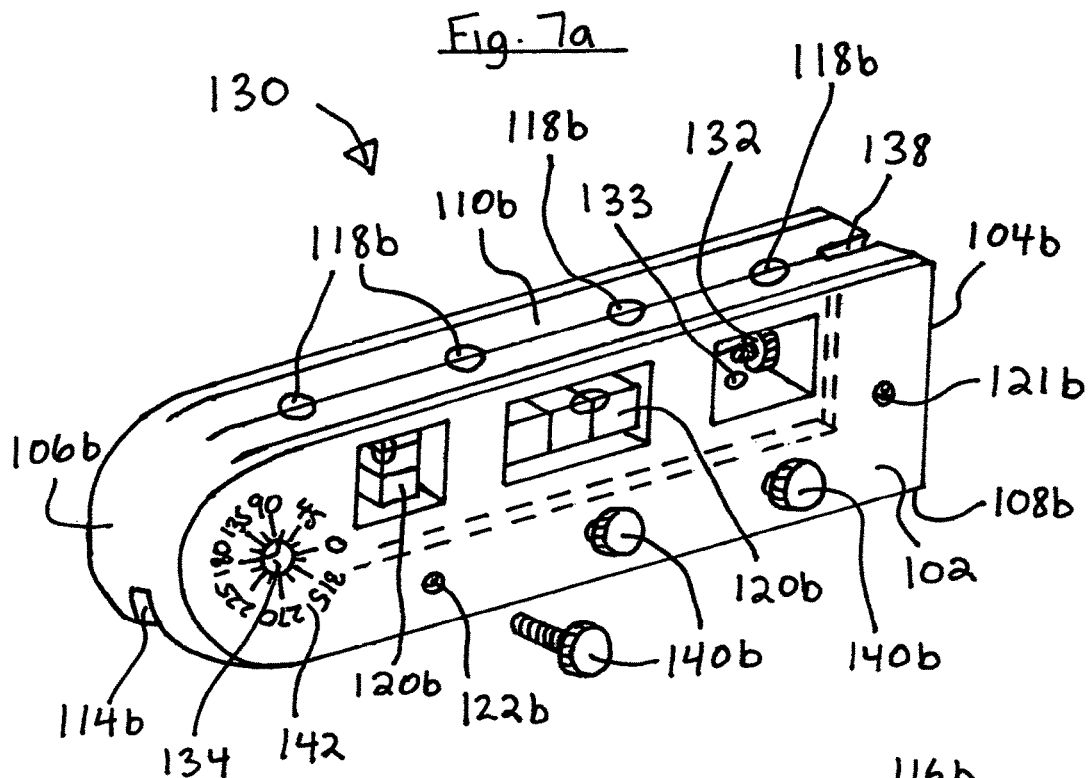
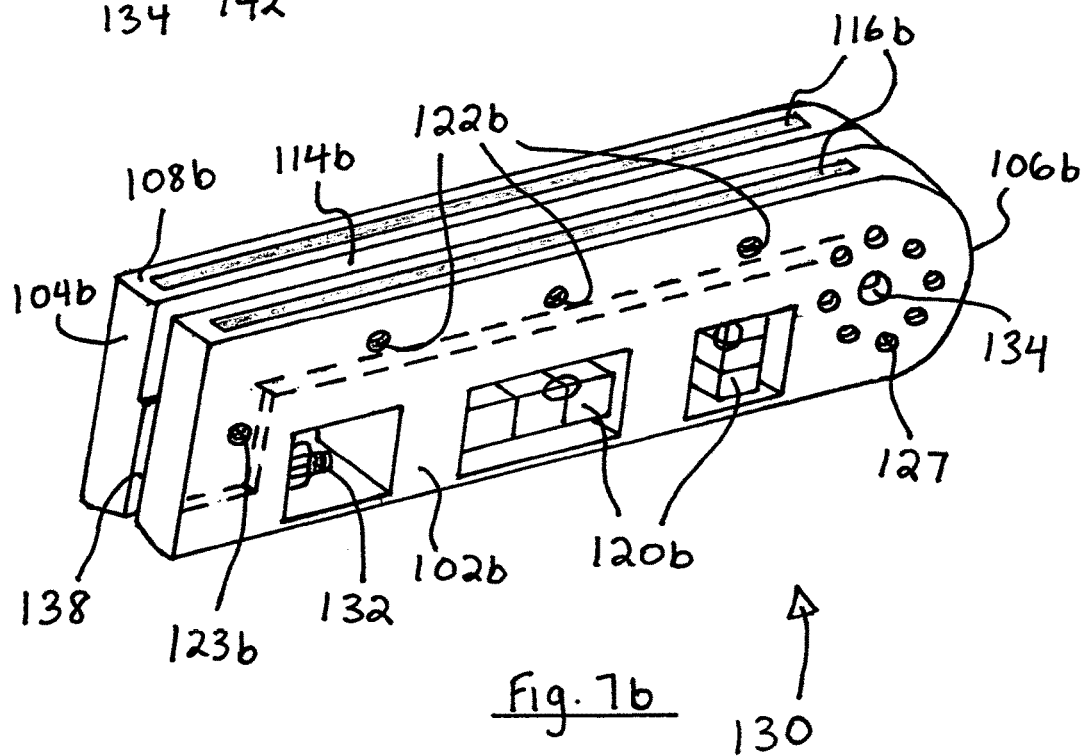

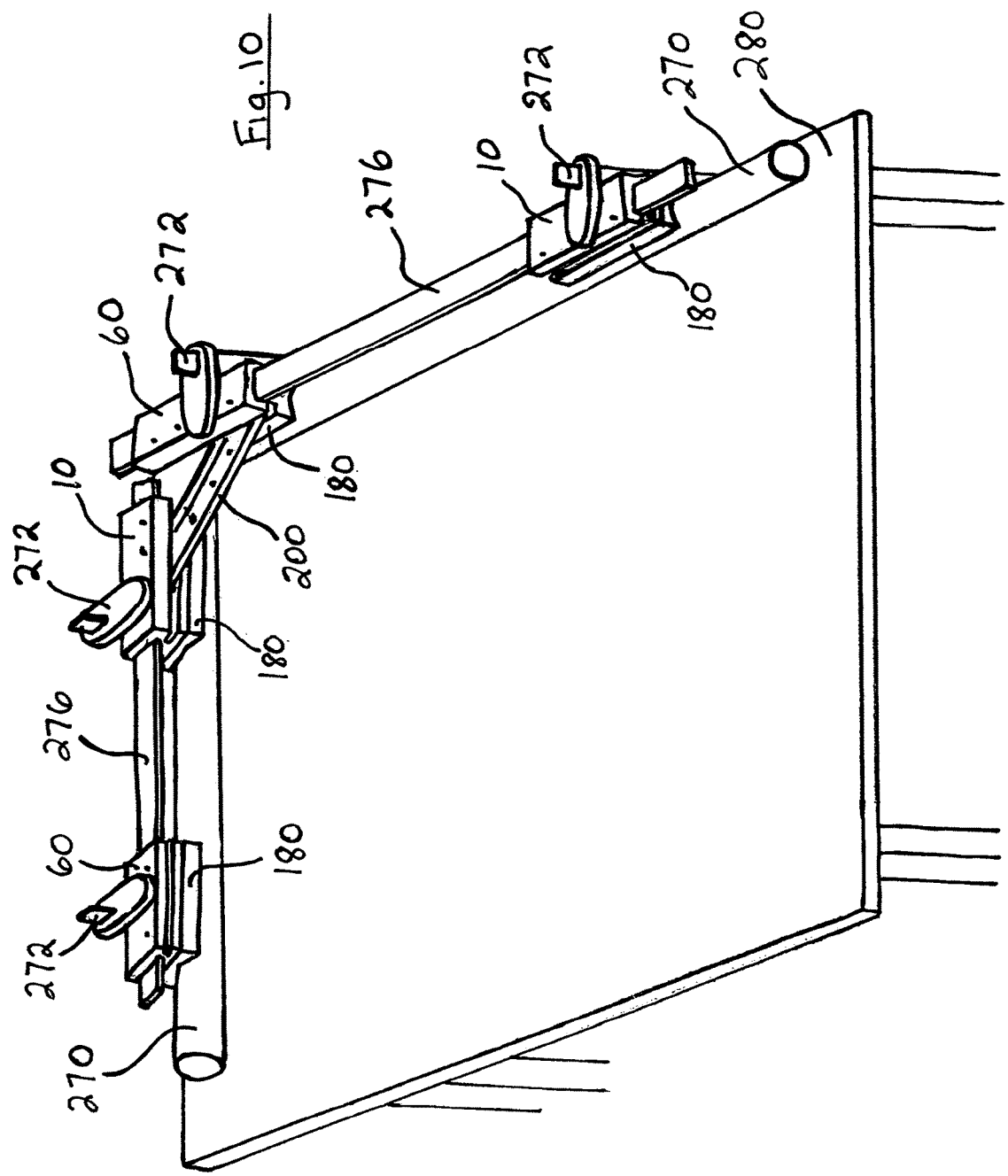

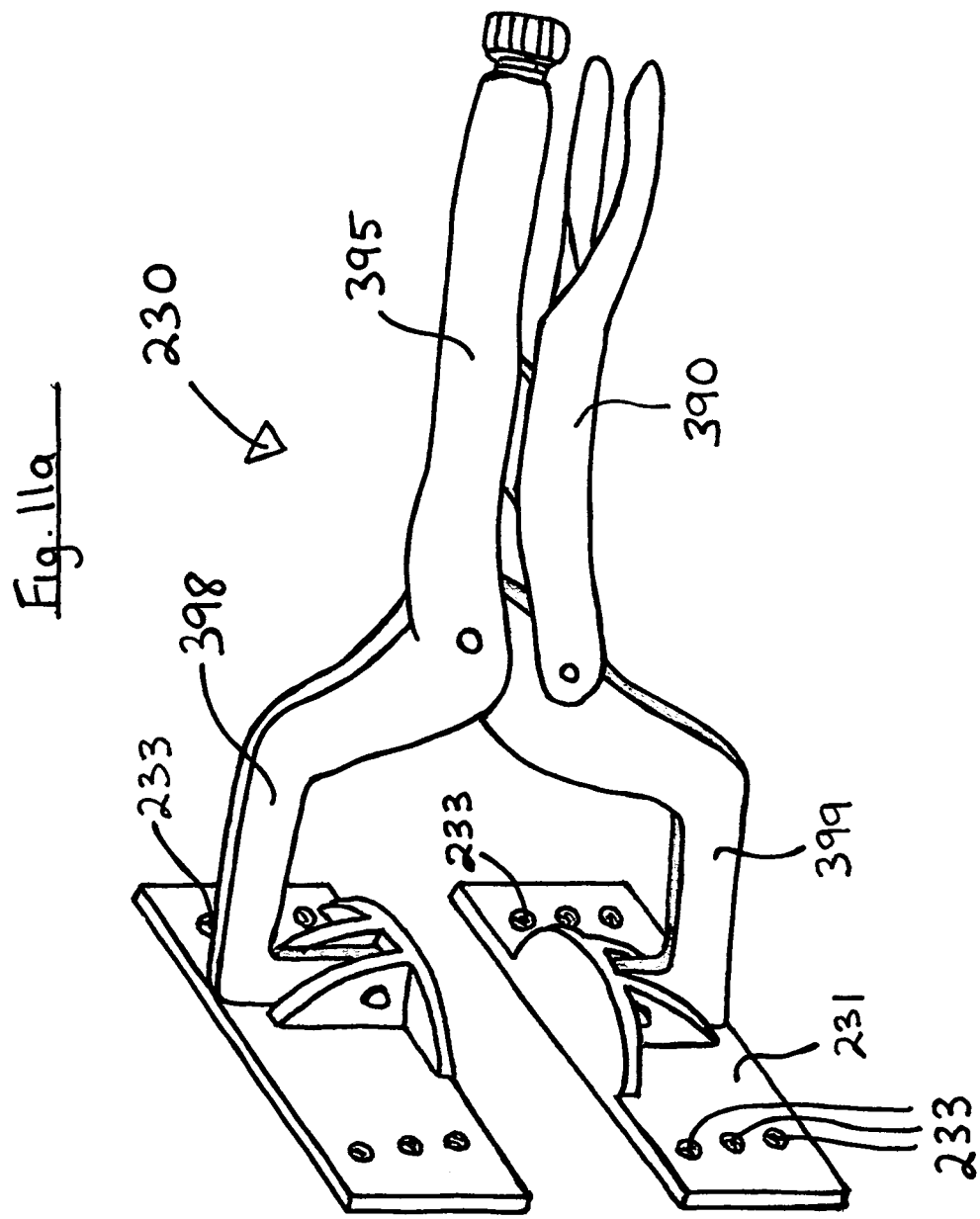

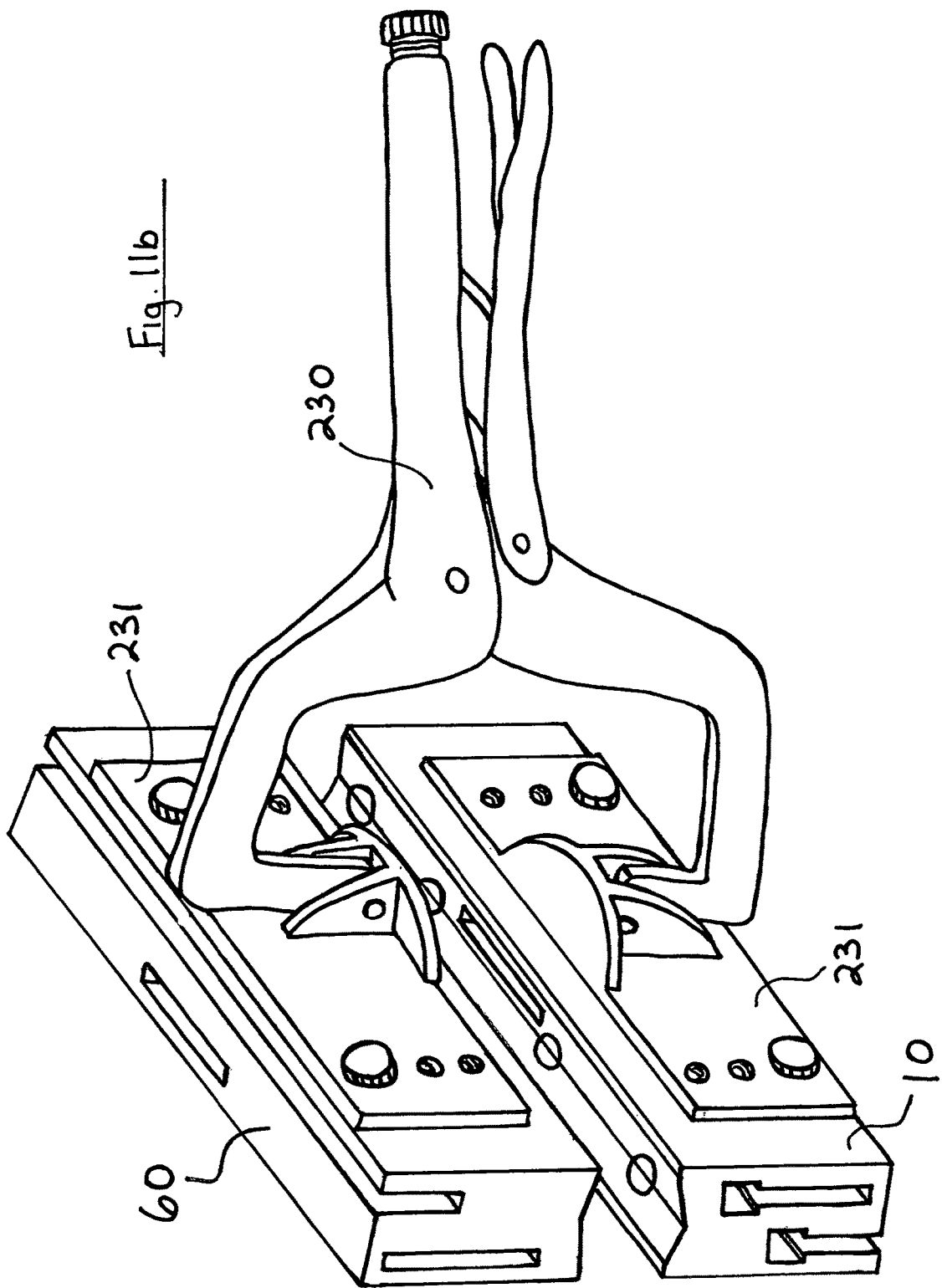

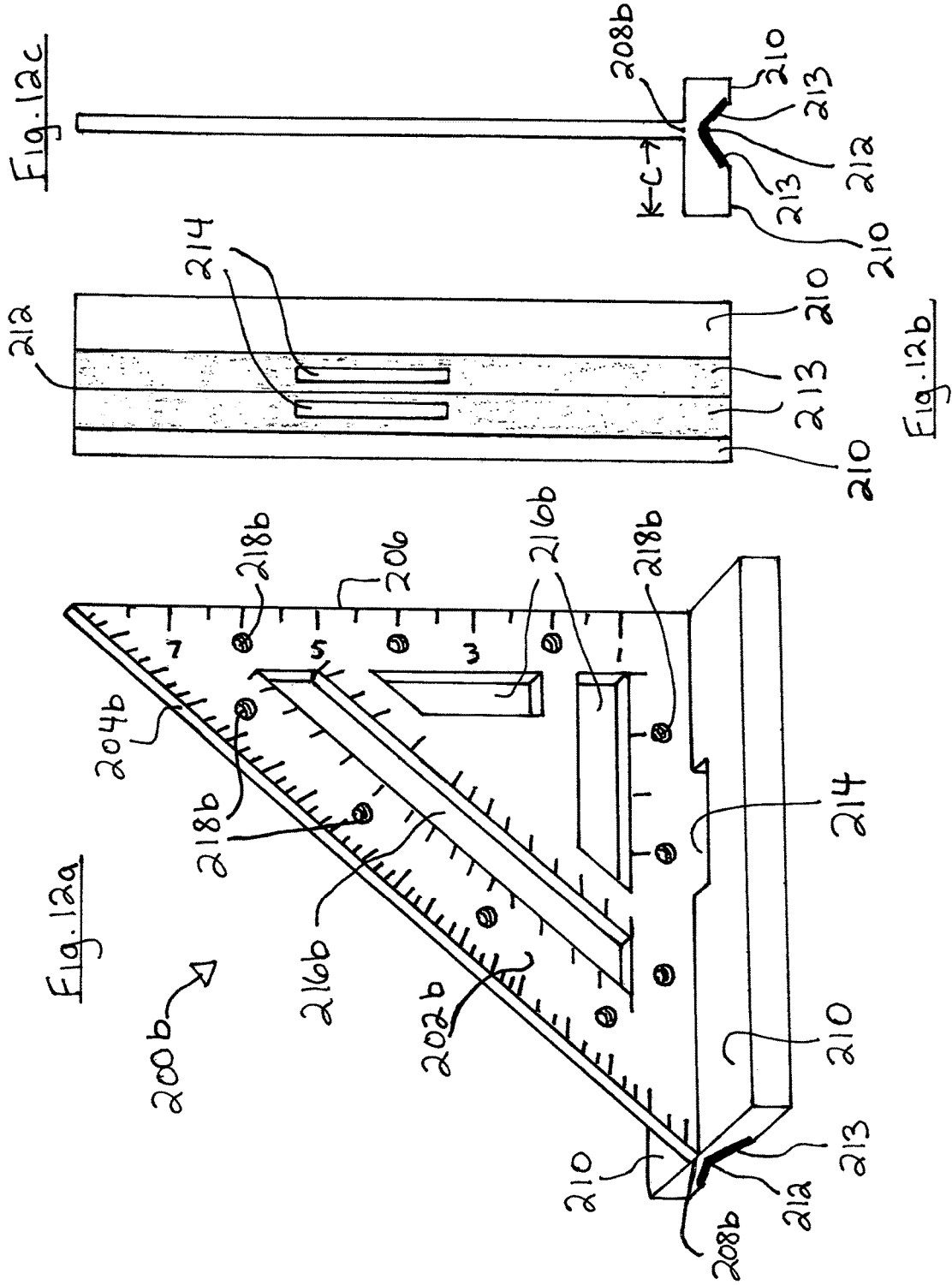

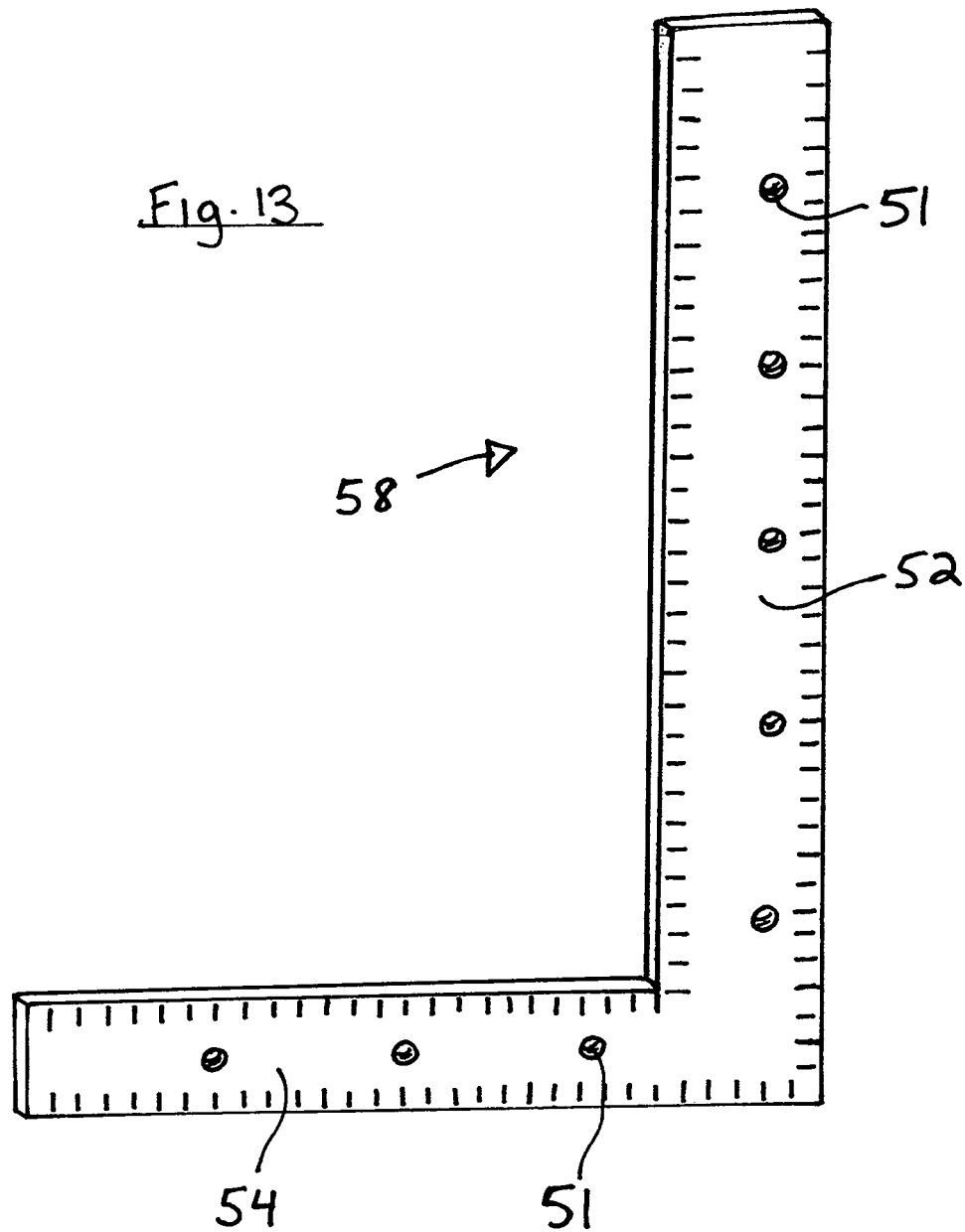

JIG OF SPIRIT LEVEL CLAMPING AID TOOLS, SQUARES AND HAND CLAMPS

FIELD

This invention relates to tools or clamping aid tools for use with common hand tools such as squares and straight edges/rulers and various hand clamps, for use therewith.

BACKGROUND

Common tools such as a carpenter square, framing square, speed square, or the like, are used to check squareness of alignment of various materials or objects when they are being fit and secured together. However, these squaring tools are not normally clamped to materials or objects because it may be difficult to do in many cases, not practical or may require an assistant to help hold a squaring tool accurately in place.

The following paragraphs are not an admission that anything discussed in them is prior art or part of the knowledge of persons skilled in the art.

Various types of squares, including carpenter, framing and speed squares are known, and a variety of spirit levels are also known and additionally various hand clamps are also known. These tools are configured to be used independently, and are not configured to be used together, or securely attached for different uses.

Multi tool jigs are disclosed in U.S. Pat. Nos. 7,591,076; and 5,971,379;

Angle finders and the like are disclosed in U.S. Pat. No. 4,955,144, 20090064516, U.S. Pat. Nos. 5,586,395; 5,189,804; 4,394,801, 5,384,967; 4,745,689, 5,675,901, 2,526,852; and 4,348,815;

Additionally, Speed Squares are disclosed in U.S. Pat. Nos. 5,187,877, 5,170,568, 4,773,163 (contains a wider flange base,), U.S. Pat. No. 6,314,652 (with spirit level), U.S. Pat. Nos. 6,820,345 and 6,662,460;

Torpedo Levels are disclosed in U.S. Pat. Nos. 5,199,177, and 4,593,475; 20070271802, 2,789,363, 4,876,798 and 5,103,569

'T' Squares are disclosed in U.S. Pat. Nos. 4,525,933; 4,060,902 and 3,273,246

Extendable levels are disclosed in U.S. Pat. Nos. 4,928,395; 5,433,011 and 4,003,134

Hand clamps are disclosed in U.S. Pat. Nos. 4,850,254, 4,673,174, and 6,000,686;

Combination squares are disclosed in U.S. Pat. D2336955, and U.S. Pat. No. 4,028,814;

Try squares are disclosed in U.S. Pat. Nos. 288,807; and 2,246,260;

Framing squares are disclosed in U.S. Pat. Nos. 4,200,990; 7,854,070 and 4,420,891A;

The contents of all these patents and published applications are hereby incorporated by reference.

SUMMARY

In accordance with the first aspect of the present invention, there is provided a clamping aid tool or multiple clamping aid tools for use with common hand tools such as carpenter squares, framing squares, speed squares, straight edges, rulers and the like. Each clamping aid tool comprising a body, and one or more elongate slots. The elongate slots can be open, closed or a combination of open and closed along the bottom flat edge surface for mounting to these squares and straight edges. The elongate slot heights include dimensions corresponding to squares and straight edges. The clamping aid tools can include threaded holes on either side of the tool with mounting screws for clamping or securing to any one of the previous mentioned tools, for creating a jig. The clamping aid tools includes a flat bottom edge surface, for aligning and securing flat objects and a 'V' groove on the top edge surface, for aligning and securing round objects. Both edge surfaces can include various types of magnets, and thus the clamping aids can secure to various objects or materials that are flat and/or round, magnetic or not. The clamping aid tools can also include one or more spirit vials to assist in aligning and securing these various objects and/or materials together at various angles. A perpendicular slot can be included in a clamping aid tool for creating other tools, such as a try square, a combination square or a 'T' square.

In accordance with a second aspect of the present invention, there is provided a combination of two clamping aid tools. The clamping aid tools include a rounded end surface and a flat end surface, and includes a pivot at the rounded end in both clamping aid tools, pivotally connecting the two clamping aid tools with mounting hardware, to form a multi-function angle finder, and whereby in use, each tool can be mounted to one of a ruler, straight edge and/or various squares to form a variable and/or extendable angle finder. To find an angle or align objects or materials at correct angles, the tool can include a 360 degree scale.

A spring loaded devise can be used in addition or alternatively to the clamping screws in some clamping aid tools to secure the tools to the various squares, straight edges, rulers, or the like.

In accordance with a further aspect of the present invention, two versions of component brackets with rows of mounting holes spaced ½ inch apart can be mounted to the clamping aid tools at different heights and/or positions, to correspond to the various dimensions from squares and straight edges. The two component brackets can include a flange or multiple flanges for use with various hand clamps to clamp these clamping aid tools more easily to various materials objects being fitted and/or secured together. The first component bracket includes a side flange joined to two perpendicular end flanges. Each end flange contains a matching 'V' groove, and when the bracket is mounted and secured to a clamping aid tool, a second 'V' groove surface is provided that is perpendicular to the top edge surface 'V' groove of the clamping aid, for added versatility in aligning and securing round objects together in different arrangements, including in a vertical or horizontal position. In a further embodiment, a clamping aid tool can include a built-in first component bracket. The component brackets can also be used with the various squares of the present invention, discussed below, for various uses.

In accordance with a third aspect of the present invention, two or more clamping aid tools are provided, each comprising at least two slots that correspond to common dimensions of carpenter squares, framing squares, straight edges, and/or rulers. The second slot allows for extending the length of the jig, by using additional squares and/or straight edges in the second slot of each clamping aid tool, coupled with a further set(s) of clamping aid tools. A ½ inch high sleeve housing with sleeve insert is provided for some clamping aid tools, to adjust for different heights and dimensions of the common tools previously mentioned.

In accordance with a further aspect of the present invention, there is provided a triangular square to be used in conjunction with the clamping aid tools previously mentioned, to ensure a more reliable and accurate 90 degree angle, compared to a carpenter or framing square. A carpenter and framing square can become out of square, requiring more care, periodic checking for squareness, and may need to be corrected or replaced. In addition, the triangular square provides for the use of a 45 degree angle, and the main body includes mounting holes that align and secure to the previously mentioned clamping aid tools and/or component brackets. The mounting holes of the triangular square further ensure accurate positioning of the clamping aid tools. The alignment of mounting holes between these clamping aid tools, component brackets and triangular square, allow for interchangeable use and can create new tools, including a speed square, a welders magnet or a corner clamp, just to name a few. The extra slot(s) in each clamping aid tool(s) mounted to the triangular square, allows the length of the jig to be extended by coupling to additional straight edges, squares and clamping aid tools. The longer the jig, the more accurate or square the assembly will be.

In accordance with a further aspect of the present invention there is provided a speed square, and an alternative embodiment of the triangular square, as previously mentioned. The square comprising a triangular portion, and a flange secured to the triangular portion on one edge, perpendicularly thereto and extending on both sides of the triangular portion. One portion of the flange surface area is extra wide for ease of clamping of the speed square. The bottom of the flange contains a 'V' groove with magnets for securing and aligning a round pipe or the like, in accordance with the present invention. The clamping aid tools and component brackets as previously mentioned, can be mounted to one of the two edges without a flange, to align various objects. Slots are included in the flange adjacent to the triangular portion, to permit passage and use of band strapping around round objects. A triangular square previously mentioned in combination with the previously mentioned clamping aid tools of the invention, can basically create a conventional speed square, but with extra features. Clamping aid tools can function with either speed square (conventional or as claimed in the present invention), but the triangular square previously mentioned, adds more versatility.

In accordance with another aspect of the present invention, there is provided a common hand clamp adapted for use with the clamping aid tools previously mentioned to help assist in clamping a jig to various objects. Various common hand clamps would be required regardless, to clamp the jig to various objects. The clamp includes two clamping aid elements attached (pivotally or fixed) to the hand clamp arms of locking clamps, or jaws of bar and pipe clamps. The clamping aid elements include mounting holes to mount to the clamping aid tools for increased ease and versatility of the clamping aid tools.

In a further embodiment of the present invention, the hand clamp and clamping aid elements with pivot can include built-in slots of various heights and widths, to correspond with dimensions from squares and straight edges, in accordance with the present invention. Various hand clamps, including locking 'C' clamps, regular 'C' clamps, bar and pipe clamps, can be adapted with these clamping aid elements and can include some or all of the features of the clamping aid tools as previously mentioned.

In a further embodiment of the present invention, there is provided a kit comprising a combination of two or more clamping aid tools, a triangular square, and two or more component brackets that can be made of various sizes for aligning various size objects.

In a further embodiment of the present invention, there is provided a carpenter square, framing square, or plain 'L' square, that can include mounting holes that align with mounting holes of the clamping aid tools and component brackets. The various squares of the present invention, with mounting holes, and the component brackets mounted to it, can be used together for various uses, including, to form a shelf bracket for hanging shelves.

BRIEF DESCRIPTION OF THE FIGURES

For better understanding of the present invention and to show more clearly how it may be carried into effect, reference will now be made to the following drawings, by way of example, in which:

FIG. 1a shows a front top perspective view of an embodiment of a clamping aid tool with spirit level and FIG. 1b shows a bottom back perspective view of a first embodiment of a clamping aid tool with spirit level;

FIG. 2a shows a front top perspective view of a second embodiment of a clamping aid tool with spirit level, and FIG. 2b shows a bottom back perspective view of a second embodiment of a clamping aid tool with spirit level;

FIG. 3 shows a perspective view of a first embodiment of a triangular square with mounting holes for use in accordance with the present invention;

FIG. 4a shows a top front perspective view of a first embodiment of a component bracket of the present invention and FIG. 4b shows a top back perspective view of a first embodiment of a component bracket;

FIG. 5a shows a front perspective view and FIG. 5b shows a back perspective view, respectively of a second embodiment of a component bracket;

FIG. 6a shows a front top perspective view of a third embodiment of a clamping aid tool with spirit level and FIG. 6b shows a bottom back perspective view of a third embodiment of a clamping aid tool with spirit level;

FIG. 7a shows a front top perspective view of a fourth embodiment of a clamping aid tool with spirit level and FIG. 7b shows a bottom back perspective view of a fourth embodiment of a clamping aid tool with spirit level;

FIG. 10 shows a jig comprising two pairs of the clamping aid tools each with first embodiments of component brackets, a triangular square and multiple straight edges for forming an extended 90 degree angle pipe joint and secured using common hand clamps.

FIG. 11a shows a common hand clamp adapted with clamping aid elements, and FIG. 11b shows the hand clamp with elements connected to the clamping aid tools of a first and second embodiment of the present invention;

FIG. 12a shows a perspective side view of first embodiment of a speed.

FIG. 12b shows a bottom view of the speed square of FIG. 12a;

FIG. 12c shows an end view of the speed square of FIG. 12a;

FIG. 13 shows a perspective view of a carpenter square with mounting holes in accordance with the present invention.

DETAILED DESCRIPTION OF THE INVENTION

Figure 8:
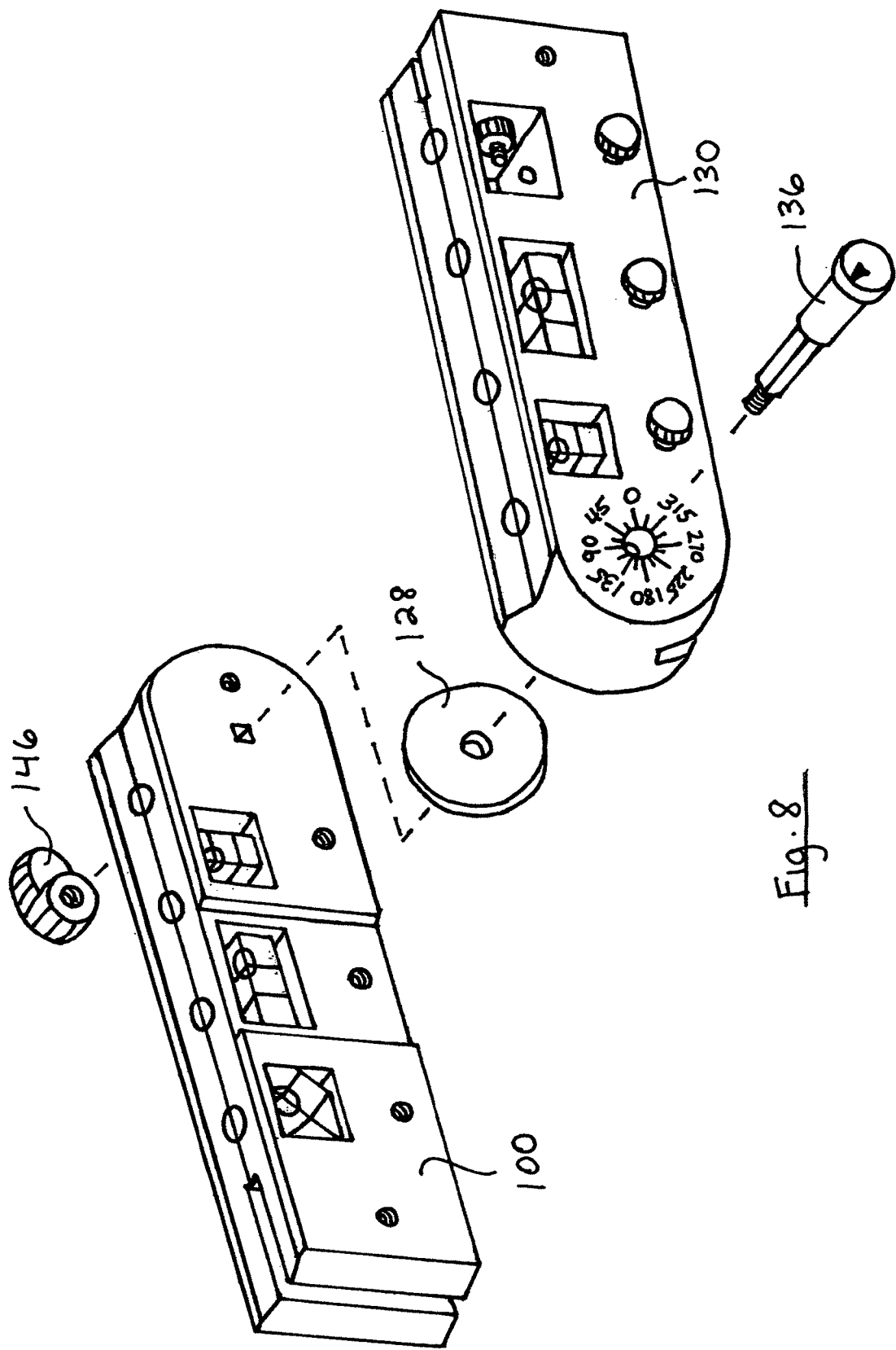
FIG. 8 shows an exploded perspective view of the third and fourth embodiments of the clamping aid tools with mounting hardware, for forming an angle finder.

Various apparatuses or processes will be described below to provide an example of an embodiment of the present invention. No embodiment described below limits any claimed invention and any claimed invention may cover processes or apparatuses that are not described below. The claimed invention is not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

In this specification, including the claims, reference is made to a 'straight edge' to mean a tool or object that provides straight edges, including straight edges and rulers, and to a 'square' to mean an square, including a carpenter square, framing square, try square or the like. Squares and straight edges can be made of any suitable material or a combination of materials, but generally will be formed from a sheet metal (e.g. aluminum or steel) of uniform thickness.

A first embodiment of a clamping aid tool is shown at (10) in FIGS. 1a and 1b, and is generally rectangular. This first embodiment (10) has side surfaces (12) and (13), end faces (14) and (16), a top edge surface (20) and a bottom edge surface (18).

Two rectangular openings or elongate slots (30) and (32), have heights of 1½ inches and 2 inch respectively, and are provided in the body of the clamping aid tool (10). The two slots (30) and (32) extend the length of the clamping aid tool (10), between the end faces (14), (16). Slots (30) and (32) contain a housing (23) and (22) respectively, in the top portion of each slot for a removable ½ inch tall sleeve insert (40). FIG. 1a shows a sleeve insert (40) being removed from slot (30). When the sleeve insert is inserted in either slot housing it decreases the height of the slot height by ½ inch.

The sleeve insert (40) can be removed or inserted as required when using different size squares and/or straight edges or when coupling to a further clamping aid tools using further squares or straight edges for extending the length and accuracy of the angle measured or the work being assembled. The slot (30) can have approximately 3/16-¼ of an inch opening to mount various carpenter, framing and speed squares easily, including the triangular square of the present claimed invention, discussed in more detail later in the application. The slot (32) can have a 3/16-¼ inch opening, to slide over a straight edge/ruler or the legs of a carpenter or framing square.

The top edge surface (20) is provided as a 'V' shape groove (34) for abutting a pipe or the like. Magnets (26) are provided for mounting the clamping aid tool (10) to a ferromagnetic pipe or the like.

Threaded holes (36) are provided for mounting screws (38) which may be brass or another material and preferably non-marring. The mounting screws (38) can engage various squares, straight edges/rulers or the like, inserted in the slots (30) and (32), to clamp and/or secure them in place. The mounting holes are spaced equally apart to correspond and secure with other tools or component brackets of the present Invention.

A spirit level vial (49) can be provided in an opening (43) in the body of the tool above the elongate slot (30). The spirit level is at 0 degrees or level with the elongate slot. The opening (43) Is continuous throughout the body and the spirit level vial can be viewed from both sides (12) and (13).

Slot (47) extends the full length from the top edge surface (20) to the bottom edge surface (18) and permits a 2 inch straight edge to be inserted to form a tool known as a 'T' square. Alternatively, the width of the slot may be of a different measurement.

For simplicity, like components are given the same reference numerals as for the embodiment of the FIG. 1 but with the suffix 'b'

Referring to FIGS. 2a, and 2b, there is shown a second embodiment of a clamping aid tool indicated generally by the reference (60). This second embodiment (60) has side surfaces (12b) and (13b), end faces (14b) and (16b) a top edge surface (20b) and a bottom edge surface (18b).

A spirit level vial (49b) can be provided in an opening (43b) in the body of the tool above the elongate slot (29). The spirit level is at 0 degrees or level with the elongate slot. The opening (43b) Is continuous throughout the body and the spirit level vial can be viewed from both sides (12b) and (13b).

The clamping aid (60) includes slots (29) and (31), which, as shown, can have heights of 1 inch and 2 inch respectively, and are provided in the body of the clamping aid tool (60). The slots (29) and (31) have width openings of approximately 3/16-¼ inch. The slots width openings fit various squares and straight edges easily. The two slots (29) and (31) extend the full length of the clamping aid bracket tool (60), between the end faces (14b), (16b). Slot (29) is open along the bottom edge surface (18b) and slot (31) is closed.

Similarly, the edge surface (20b) is provided as a 'V' shape groove (34b) for abutting a pipe or the like. Magnets (26b) are provided for mounting the clamping aid tool (60) to a ferromagnetic pipe or the like. Mounting screws (38b) on either side of the tool engage threaded bores (36b) to clamp various squares, straight edges/rules or the like, and can pass through to extend to the adjacent or opposing slot of either (29) and (31). It will be understood that holes or openings are provided in the portion of the clamping aid tool between the slots (29) and (31).

Slot (47*b*) extends the full length from the top edge surface (20*b*) to the bottom edge surface (18*b*) and permits a 2 inch straight edge to be inserted to form a tool known as a 'T' square, or for use with various band strapping when securing a pipe mounted on the top 'V' groove of the tool. The width of the slot may be of a different measurement.

FIG. 3, shows a first embodiment of a right-triangular square (200), for use with clamping aid tools, component brackets, or with the hand clamp with clamping aid elements of FIG. 11, (discussed later in application) of the claimed invention. In known manner, the triangular square (200) has a main body (202), an edge (204) that is at a 45 degree angle to edges (206) and (208).

Additionally, the triangular square (200) can include holes in the triangular portion of the body (218) for mounting to various clamping aid tools and/or component brackets.

The triangular square (200) can also include slots indicated at (216), each being generally of uniform width and parallel to one of the sides (204), (206), and (208).

The thickness of the triangular square, at the edges (204, 206, 208) may be approximately 3/16 to 1/4 of an inch, to correspond with the exact width of the open elongate slots along the bottom edge surface of clamping aid tools (10), and (60) of FIGS. 1 and 2, and (100) and (130) of FIGS. 6 and 7. When the thickness of the body of the square equals the exact width of the elongate slot of the clamping aid tools, the 'V' groove centerline of both clamping aid tools will align.

Referring to FIGS. 4*a* and 4*b*, shows a first embodiment of a component bracket (180). The component bracket (180) can connect to clamping aid tools (10) and (60) of FIGS. 1 and 2, and clamping aid tools (100) and (130) of FIGS. 6 and 7, and/or triangular square (200) of FIG. 3, and speed square of FIG. 12. The component bracket (180) comprising generally of an 'I' shape bracket with perpendicular flanges on both ends. A front face (193), combined with an opposing rear face (192) contains three rows of threaded holes (199), that is perpendicular to face flange (187), and both perpendicular surfaces extend between end face flanges (182) and (184). The end face flanges provide matching 'V' grooves (196) on the front edge surface (190), for use with a round object. A top edge surface (188) provides matching 'V' grooves (194) perpendicular to the front edge surface 'V' grooves (196). A bottom edge surface (186) is the back of the face flange (187), and contains a row of threaded holes (166), that align and secure to the various tools previously mentioned and other tools discussed below. The threaded holes (199) of each row are spaced 1/2 inch apart from each other to correspond to the various heights dimensions of a carpenter square, framing square, straight edge, or ruler, when secured to the clamping aid tools of the disclosed invention. Alternatively, the top edge surface can be completely flat, (not shown), with no 'V' grooves on the end face flanges.

Figure 14:
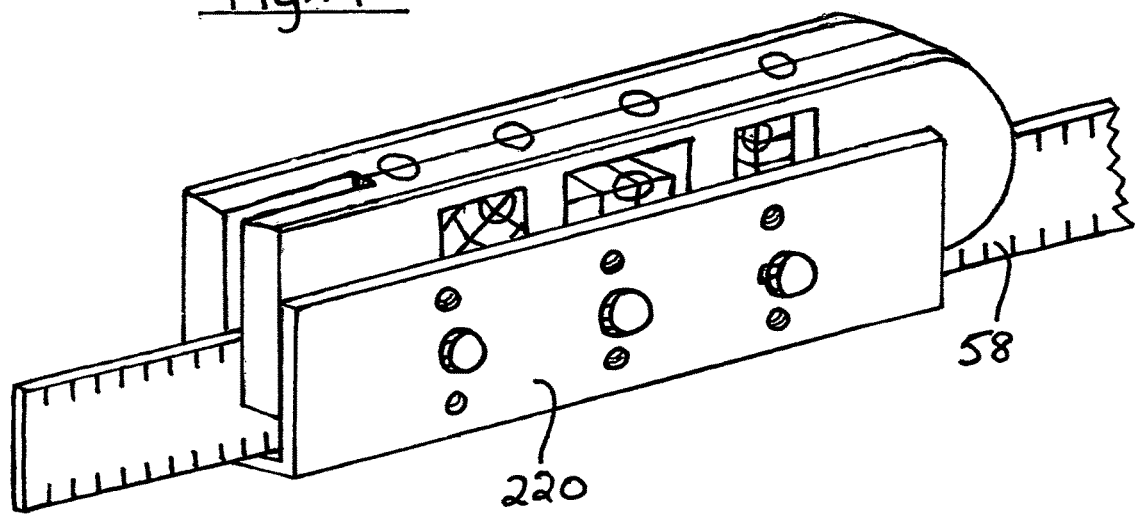
FIG. 14 shows the third embodiment clamping aid tool with the second embodiment component bracket and FIG. 15 shows the third embodiment of the clamping aid with the first embodiment of the component bracket of the present invention.
Figure 15:
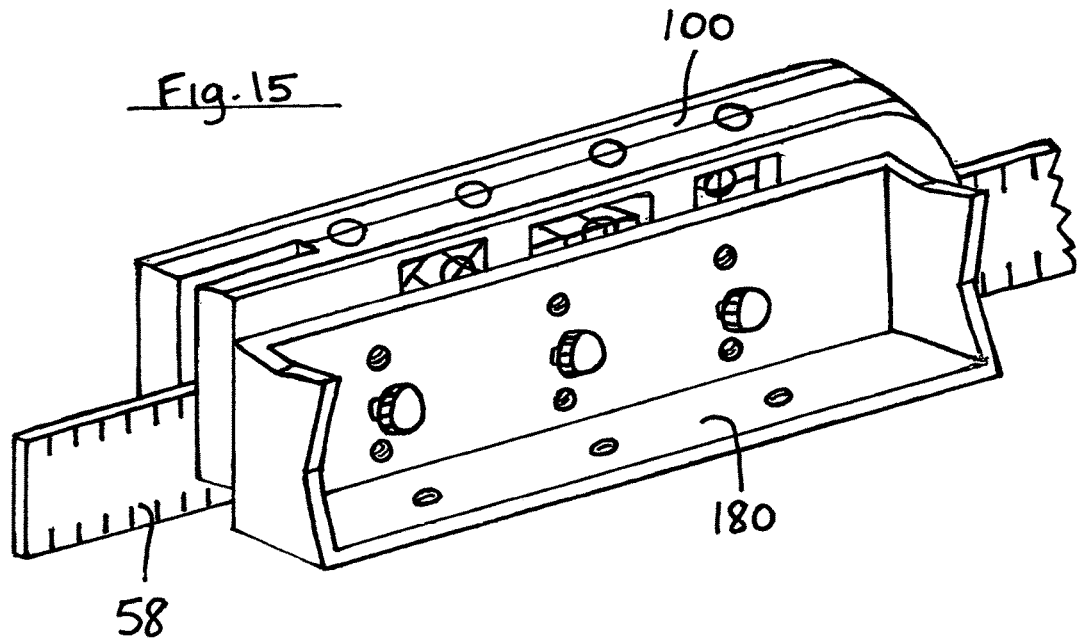

FIGS. 5*a* and 5*b* show a second component bracket (220). The bracket (220) is essentially L-shaped, with two sides (222) and (224), each including a series or rows of holes indicated at (227) and (229) respectively, for mounting to various clamping aid tools and/or triangular square (200). The component bracket adjusts the mounting height of the clamping aid tools in accordance with the various dimensions of a carpenter square, framing square, a straight edge, or ruler. The row of holes of side (222) are spaced 1/2 inch apart and approximately 5/8 of an inch in from the outside corner edge (1/2 inch plus whatever the thickness of the material) of the component bracket (220). The row of holes of side (224) are also spaced 1/2 inch apart and 1/2 inch in from the corner edge. The mounting of one side vs the other, secured to any of the clamping aid tools (10), (60), (100) and (130), can provide either a closed bottom slot as shown in FIG. 14 or an open bottom slot as shown in FIG. 15, with the first component bracket, instead.

Reference is now made to FIGS. 6*a* and 6*b*, which shows a third embodiment of a clamping aid tool with spirit level (100). The clamping aid tool (100) has sides (101*a*) and (101*b*), a flat end surface (104), and a rounded end surface (106), which may be in the shape of half of a cylinder. Edge surfaces (108), and (110) complete the body of the clamping aid tool (100) with spirit level.

A elongate slot (114) is provided in the edge surface (108), extending between the end surfaces (104), (106), and can be 1 inch in height and approximately 3/16-1/4 of an inch wide. Alternatively, the slot can be of a different height and width. Recessed cutout or slot (126) located on the side (101*a*) is 2 inch wide for use with 2 inch wide straight edge/rule secured in place using component bracket (220) with mounting screws (140) to form a tool known as a 'T'-square. The recessed cutout (126) can alternatively be replaced with a slot in the body of the clamping aid tool as shown in FIGS. 1 and 2, and the slot can be located between the spirit level vials of the tool, and independent of the elongate slot.

Alternatively, the clamping aid tool with spirit level (100) has a slot (112) inline and perpendicular with the elongate slot (114) in the flat end surface of (104), extending between the edge surfaces (108) and (110), that is 1½ inch deep, for 1½ inch wide legs of either a carpenter or framing square to form a tool known as a try square.

As for other embodiments, magnets (116) are optionally provided, on the bottom edge surface of (108) and magnets (118) are provided on the 'V' groove of the top edge surface (110) are provided.

To provide the level function, spirit vials (120) may be provided in openings in the body of tool (100) above the slot (114) at different angles in relation to the elongate slot.

Figure 9:
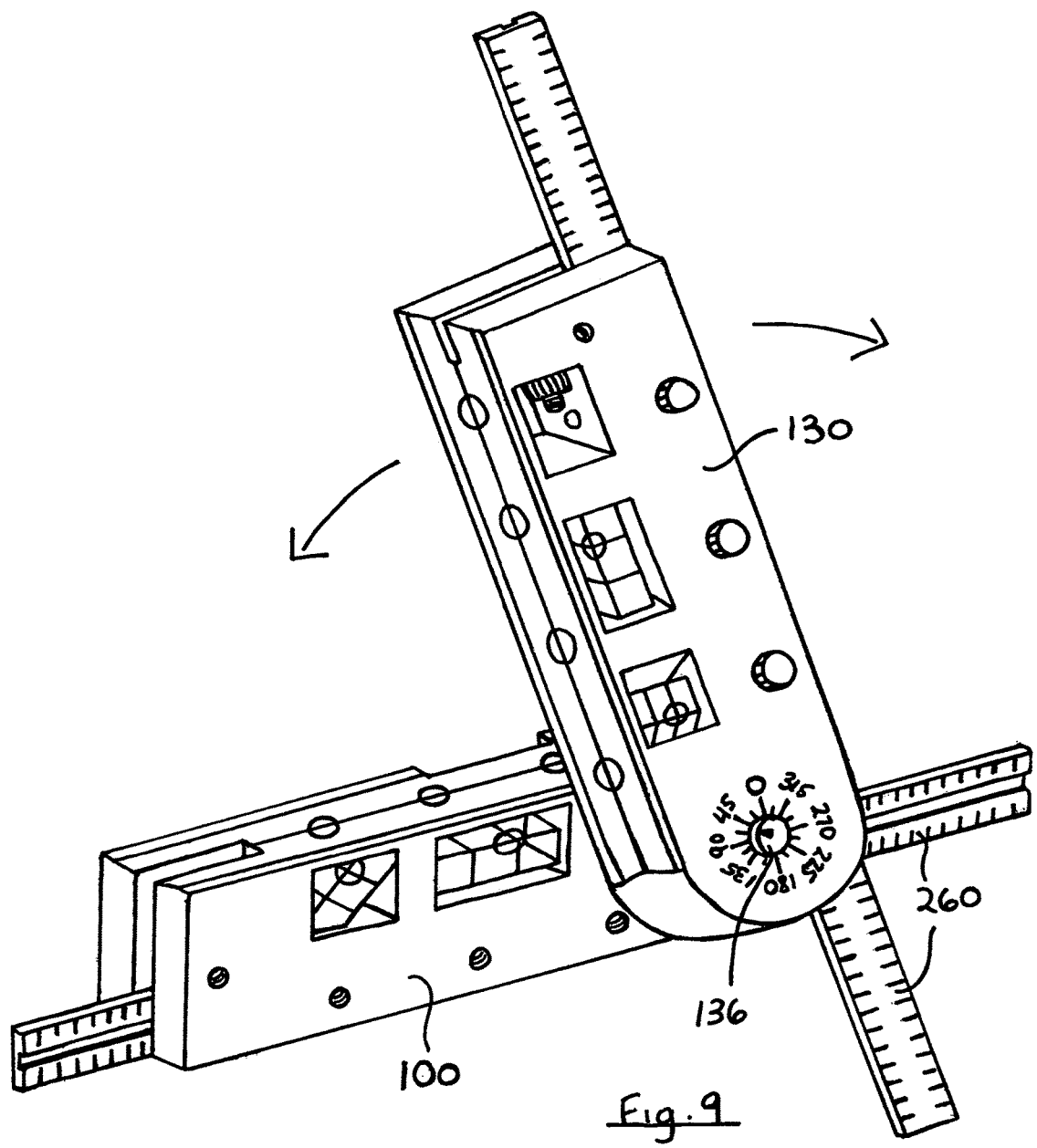
FIG. 9 shows a perspective view of the third and fourth embodiments of the clamping aid tools secured together to form a variable and extendable angle finder with the use of straight edge rulers.

Threaded mounting holes (122) are provided for clamping and/or securing the clamping aid tool (100) to a either a carpenter square, framing square, triangular square, speed square, ruler, straight edge, or the like, with mounting screws (140) as with other embodiments. A square bore or opening (124) is provided, for attachment to a further clamping aid tool (130) detailed below in FIG. 7, with mounting hardware to form an angle finder, as shown in FIG. 9, and the pivot bore is provided at a center of the cylindrical shape of the rounded end surface (106). Alternatively, bore (124) may be round and provided with the appropriate corresponding hardware.

A threaded bore (123) on side (101*b*) and a threaded bore (121) on side (101*a*) is provided to align the tool of FIG. 6, with threaded holes (121*b*) and (123*b*) of tool (130) of FIG. 7, to lock the tool in a folded/closed position with locking screw (141), not shown. These holes/bores are provided at the center between edge surfaces (108) and (110) approximately 1/2 inch in from end surface (104).

A further threaded hole(s) (135) is located on either side of the tool (100) located at end (106) to lock the tool with one of the multiple holes of (127) of tool (130) of FIG. 7, at a specific degree or angle when both tools are joined together to form an angle finder. The locking screw (141), not shown in either FIG. 6 or 7, is longer than the mounting screws (140) and is inserted through threaded bore(s) (135) of tool (100) and exiting the tool and extending into part of tool (130), in one of the threaded bore holes of (127), to lock the tool in a specific degree or angle.

A fourth embodiment of the clamping aid tool with spirit level is shown in FIGS. 7a and 7b, and indicated by the reference (130). The tool (130) is similar to the clamping aid tool (100) with spirit level, and like components are given the same reference numeral but with a suffix 'b'.

A mounting screw (132) is provided, as is commonly provided in a combination square, and as disclosed in published U.S. Pat. No. 4,028,814 or US Patent Application 201410373373, incorporated by reference.

In this clamping aid tool with spirit level (130), the elongate slot (114b) is 1 inch high by approximately 3/16-1/4 inch wide, and is open along the bottom edge surface of (108b), extending the length of the tool. A perpendicular slot (138) is approximately 5/8 inch deep by 3/32 inch wide, and is provided in the end surface of (104b) extending between the edge surfaces (108b) and (110b), for use with a ruler (not shown) as in a combination square tool, using mounting screw (132). A opening for a combination mounting screw (132) is provided in the body of the tool and inserted into hole (129), not shown, for engaging slot (138). A straight edge ruler (not shown) can be inserted in slot (138), and the mounting screw engages a groove in the ruler for securing the ruler in position. A perpendicular hole (133) may additionally be provided for the combination mounting screw to additionally engage and secure a straight edge ruler inserted in the elongate slot, (again, not shown), in addition to the threaded holes (122b) and mounting screws (140b).

Threaded mounting holes (122b) are provided on both sides of the tool for clamping and/or securing the clamping aid tool (130) to a carpenter square, framing square, speed square, ruler, straight edge, or the like, with mounting screws (140b) as for other embodiments.

Threaded holes (127) are located on side (102b) of the tool (130). A locking screw (141), longer than mounting screw (140b) and not shown in either FIG. 6 or 7, is inserted through threaded bore (135) of tool (100) and exiting the tool (100) and extending into part of tool (130) in one of the holes of (127) of tool (130) to lock the tool in a specific degree or angle, when both tools are joined together to form an angle finder of the present invention.

As with the other embodiments, magnets (116b) are optionally provided, on the bottom edge surface (108b) and magnets (118b) are provided on the 'V' groove of the top edge surface (110b).

To provide the level function, multiple spirit vials (120) are provided in openings in the body of tool (130) above the elongate slot and at various angles in relation to the elongate slot.

Additionally, a round pivot bore (134) is provided at end (106b) of the tool (130), for securing to tool (100) of FIG. 6 with mounting hardware, as shown in FIG. 8, to form an angle finder as shown in FIG. 9. A degree marking scale of 0-360 degrees is located at (142) of side (102) at end (106b) to indicate the angle measured and/or required. Threaded bore (121b) is provided in side (102) of tool (130) and a threaded hole (123b) on side (102b) is provided for locking to a previously detailed clamping aid tool (100) when secured together in a folded or closed position and these holes are provided at the center between edge surfaces (108b) and (110b) approximately 1/2 inch in from end surface (104b). Threaded holes (122b) and mounting screws (140b) secure the clamping aid tool to various squares, straight edges, rulers or the like.

FIG. 8 shows the clamping aid tools (100) and (130) of FIGS. 6 and 7 respectively, with mounting hardware, including a connecting screw (136) with degree indicator, at least one washer (128) and securing nut (146) for connecting both tools together to form an angle finder or a variable and/or extendible angle finder, as shown in FIG. 9.

Referring to FIG. 9, shows how the two spirit level clamping aid tools (100), and (130) can be used together to a form a variable and/or extendable angle finder. The clamping aid tools (100), (130) are connected together using installation mounting hardware, which includes the connecting screw (136) with degree indicator, that passes through tool (130), then washer (128), not visible, then through tool (100) and then secured and tighten using locking nut (146), also not visible. Various straight edges/rulers (260) of equal size of 1 inch wide minimum, are used with each of the clamping aid tools (100) and (130) to form a variable and/or extendable angle finder that can be used in a few ways, including measuring a small corner wall or bulkhead, or to extend the length of each tool (100) and (130) with straight edges when a corner of the wall or other object are open to measure freely and easily. Extending the length of each tool increases the accuracy of the angle being measured. The component brackets can additionally be used with the angle finder when aligning flat or round objects and 'V' groove center of the tool can align with the 'V' groove center of the component bracket.

FIG. 10 shows the use of the first and second embodiments of the clamping aid tools (10) and (60) of FIGS. 1 and 2 each secured to first component bracket (180) of FIG. 4, and both are mounted to a triangular square (200) using slot (30) and (29) of tools (10) and (60) respectively. Slots (32) and (31) in clamping aid tools (10) and (60) respectively, allow a second set of tools (10) and (60) each mounted again to a second set of first component brackets (180), to be joined or coupled together by using straight edges (276). In this scenario both straight edges are 2 inches wide and extend the length of the jig, to form a more accurate 90 degree angle pipe joint, of pipes (270), and using bar clamps (272) with each tool, to secure the jig to table at (280). The combination of the clamping aid tool(s), component bracket (s), and triangular square together form a jig clamping tool. A fifth embodiment of a clamping aid tool (310) with a built-in first component bracket, described later in the application, can also be used as an alternative clamping aid tool in FIG. 10.

FIG. 11a shows an embodiment of a conventional hand clamp (230) adapted for use with two clamping aid elements (231) with pivot, pivotally connected to the arms of the hand clamp (230). The hand clamp (230) includes an upper arm (398) and lower arm (399) pivotally connected to one another through a handle portion. The handle portion (395) includes a locking mechanism and a second lower handle portion (390) includes a release lever to unlock the clamp. The clamping aid element has mounting holes (233) used to connect to clamping aid tools (10) and (60) of FIGS. 1 and 2, respectively, clamping aid tools (100) and (130) of FIGS. 6 and 7, respectively, and clamping aid tools (310) and (320) of FIGS. 16 and 17, respectively. The clamping aid tools can be secured with the 'V' grooves of the clamping aid tools facing each other, as shown in FIG. 11b, or one or both tools can be flipped with the 'V' grooves facing out and away from each other, depending on the task and whether the objects are round or flat. The clamp offers portability, versatility, and ease of work task. The clamping aid elements are secured to the hand clamp as are common locking 'C' clamps with swivel head/swivel pads.

FIG. 11b shows the hand clamp (230) of FIG. 11a, with clamping aid elements (231) secured to clamping aid tools (10) and (60) of FIGS. 1 and 2 for aligning round or flat objects.

FIGS. 12a. 12b, and 12c shows an alternative embodiment of a triangular square (200) of FIG. 3, that includes a flange, to form a tool known as a speed square (200b). The speed square (200b) includes a flange (210) on edge (208). The flange (210) has two portions on either side of the main body of the speed square, with at least one portion being extra wide, as indicated at 'C' in FIG. 12c, for use with a clamp. The underside of the flange (210) has a 'V' shaped groove (212) with magnets (213) as best shown in FIG. 12c, for engaging a pipe or other tubular object. The 'V' groove center in the flange section can align with the 'V' groove center of a clamping aid tool, when used to align a pipe on the 45 or 90 degree edge of the square, thus aligning the centers of each pipe. It can be noted that the triangular square (200) of FIG. 3, and speed square (200b) without flange (210) can both be used with any one of clamping aid tools (10), (60), (100) or (130), and/or secured with either component bracket (180) and (220), can create a similar function of a common speed square, or speed square (200b), but with extra features.

FIG. 12b, shows the speed square (200b) with slots in the flange located at (214). Slots (214) in the flange and slots (216) in the body of the square, used with a clamping aid tool mounted on one of the edges can be used with various band strapping for securing a round object to the 'V' groove of the square and/or the 'V' groove of the clamping aid tool, respectively.

The V groove (212) can include magnetic strips or other magnets (213), and optionally, both flat portions of the underside of the flange (210) can also include magnets.

FIG. 13 shows a plan view of a carpenter square (58) with mounting holes to correspond and align with mounting holes of clamping aid tools and component brackets, for accurately aligning and securing to the clamping aid tools and for securing to the component brackets. The carpenter square has legs that are 8 inch by 12 inch long and having widths of 1 inch and 1½ inch, respectively. A conventional framing square, 'L' square or the like, can also be modified with mounting holes. These various squares can be secured with the clamping aid tools, either component brackets, and the hand clamps of the present invention, for creating various tools, including, a shelf hanging bracket, a corner bracket, and a tool for aligning flat or round objects, just to name a few.

FIGS. 14 and 15 show variant mountings of the component brackets (180) and (220) connected to the third embodiment of the clamping aid tool (100). FIG. 14 shows the bracket (220) mounted to the clamping aid tool (100), using the second row of holes of the bracket of side (222), while side (224), not visible, keeps the 1½ inch leg of the carpenter square only partly shown at (58) tightly in place and in correct position. The bracket (220) can be flipped and secured with side (224) with the perpendicular flange surface aimed away from the clamping aid tool and providing a flush or level surface with a square or straight edge secured in slot (114) of the tool (100) as shown in FIG. 15, but with component bracket (180), instead. The component bracket (220) can also be used with clamping aids (10), (60) and (130) and triangular square (200) of the present invention.

FIG. 15 shows mounting of the first component mounting bracket (180) to the third embodiment of the clamping aid tool (100) with spirit level (100). The bracket's second row of holes are used here to adjust the height of the clamping aid tool (100) to accommodate a 1½ inch carpenter square only partly shown at (58), but can also be used with other 'L' squares and straight edges. The component brackets can also be rotated a 180 degrees and mounted to the clamping aid tools.

FIGS. 16a and 16b shows an alternative and fifth embodiment of a clamping aid tool (310) in accordance with the present invention with a built-in component bracket. The clamping aid tool (310) comprises a body, a front face (322) a rear face (324), a top edge surface (308) with 'V' groove (303), and a bottom edge surface (306). One side of the tool includes a face flange (311), extending from the bottom edge surface (306), and is connected to perpendicular flanges (327) and (328), extending from each end face. The clamping aid tool includes two elongate slots (315) and (316) with heights of 1 inch and 2 inch, respectively, that extend the full length of the tool and correspond to dimensions from squares and straight edges. The dimensions of slots (315) and (316) correspond with one of the legs of a carpenter or framing square, respectively. The slot widths are approximately 3/16 to ¼ inch wide.

End face flanges (327) and (328) are perpendicular to front face (322) and include matching 'V' grooves (332) perpendicular to top edge surface 'V' groove.

Threaded mounting holes (340) are provided on the front face (322) and rear face (324), with mounting screws (342).

Magnets (319) are provided on the top edge surface (308) with 'V' groove (303).

A sixth embodiment of a clamping aid tool is shown in FIGS. 17a and 17b and indicated by reference (320). The sixth embodiment is similar to the fifth embodiment (310), and like components are given the same reference numbers as in FIG. 16, but with a suffix 'b'.

FIGS. 17a and 17b shows an alternative and sixth embodiment of a clamping aid tool (320) in accordance with the present invention, also with a built-in component bracket.

The clamping aid tool (320) includes a body, a front face (322b) a rear face (324b), a top edge surface (308b) with 'V' groove (303b), and a bottom edge surface (306b). One side of the tool includes a face flange (311b), extending from the bottom edge surface (306b), and is connected to perpendicular end face flanges (327b) and (328b). The clamping aid tool includes two slots, (325) and (326), both with heights of 1½ inches to that extend the full length of the tool and can correspond to the other leg of the carpenter or framing square when used with the corresponding aligned elongate slot of the clamping aid tool of FIG. 16. The slots (325) and (326) correspond to dimensions from squares and straight edges. The slots widths are approximately 3/16 to ¼ inch wide, but alternatively, can be of a different measurement.

End face flanges (327b) and (328b) are perpendicular to front face (322b) and include matching 'V' grooves (332b) perpendicular to top edge surface 'V' groove (303b).

Threaded mounting holes (340b) are provided on the front face (322b) and rear face (324b), with mounting screws (342b).

Magnets (319b) are provided on the top edge surface (308b) with 'V' groove (303b).

Figure 16:
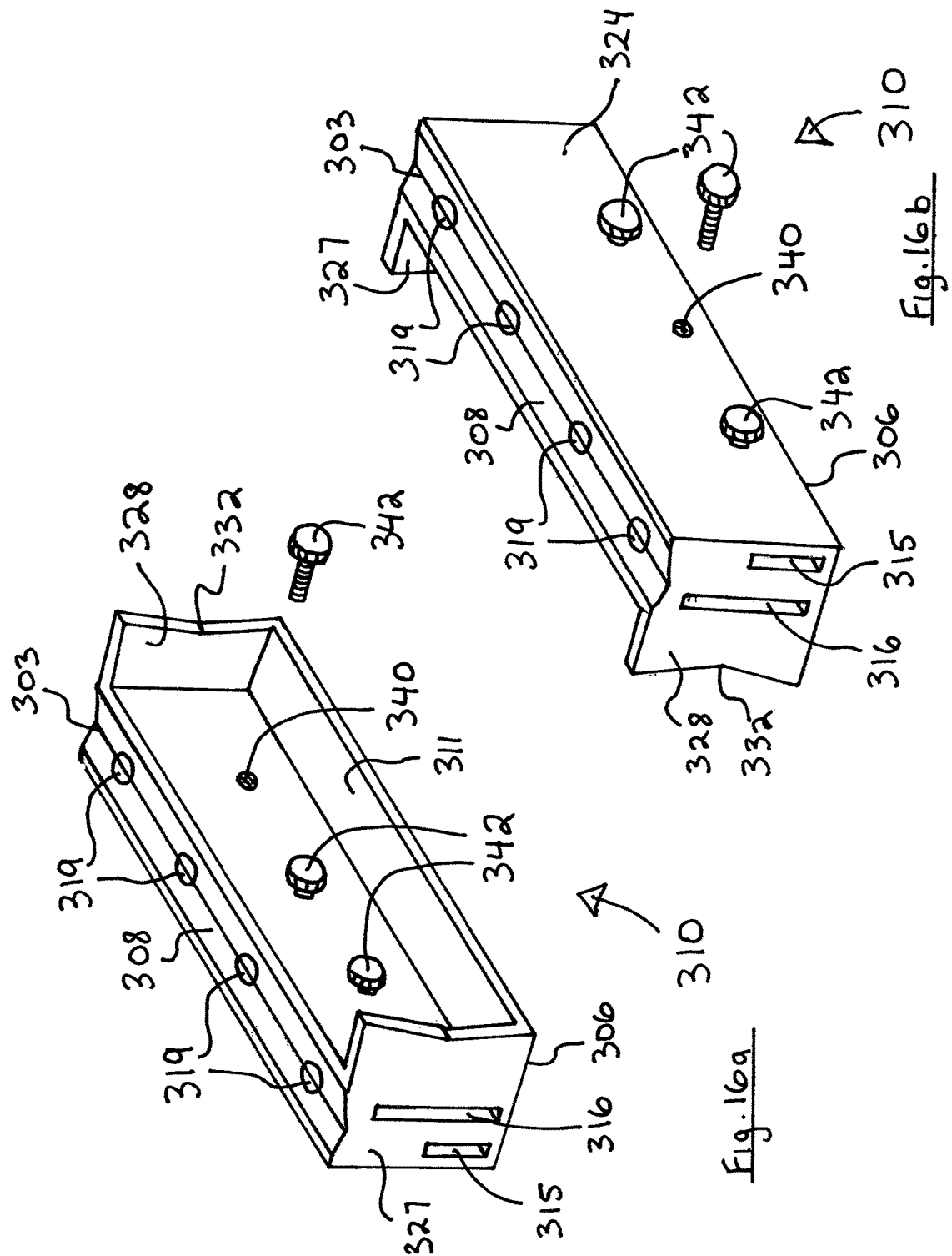
FIG. 16a shows a front perspective view of a fifth embodiment of clamping aid tool and FIG. 16b shows a back perspective view of a fifth embodiment clamping aid tool.
Figure 17:
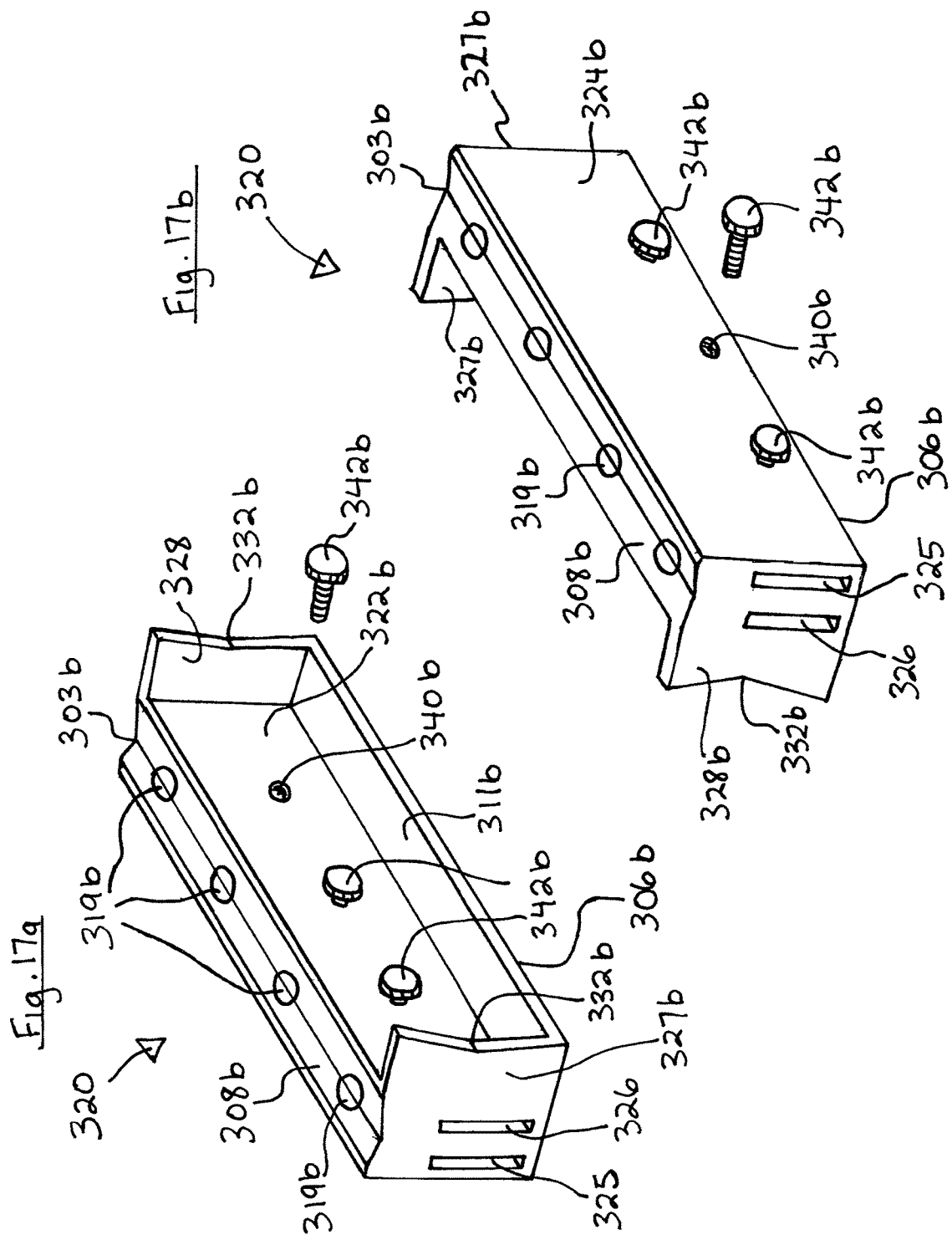
FIG. 17a shows a front perspective view of a sixth embodiment of a clamping aid tool.
FIG. 17b shows a back perspective view of a sixth embodiment of a clamping aid tool.

Alternatively, FIGS. 16 and 17, can have elongate slots of the same or of different heights, widths and combination. Alternatively, the clamping aid tools can be open on the bottom edge surface along the elongate slots, or a combinations of open and closed along the elongate slots, as in FIGS. 1 and 2, and can include additional slot(s). It will be understood that holes or openings are provided in the portion of the clamping aid tool between the slots.

Figure 18:
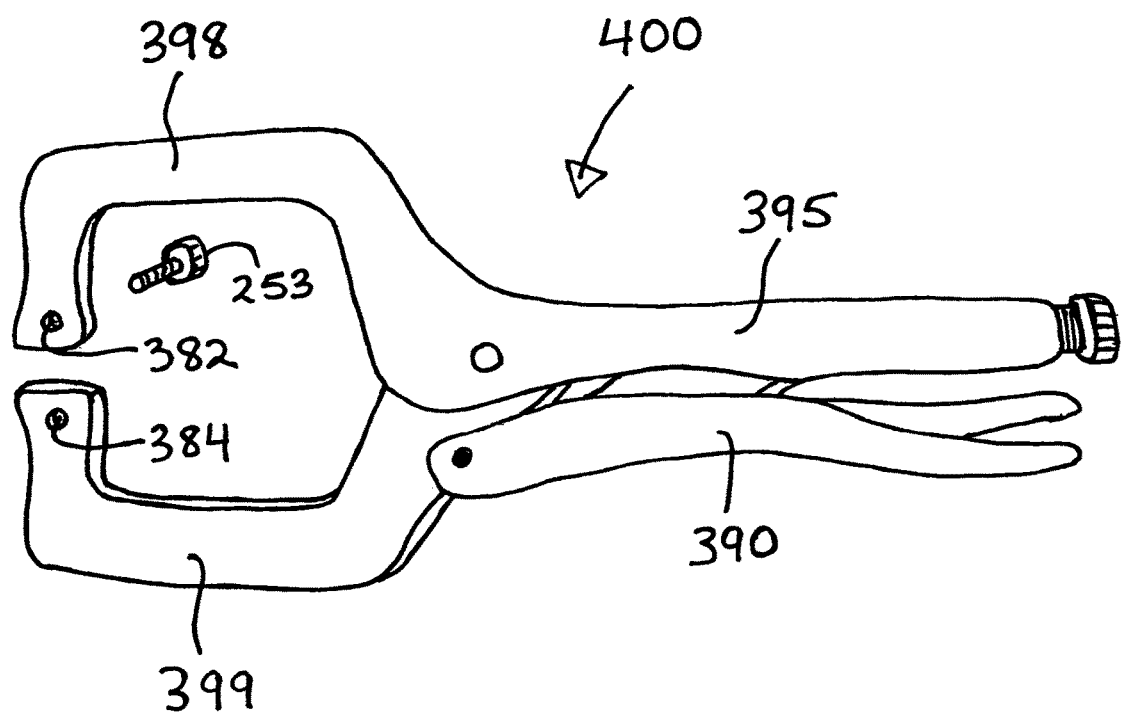
FIG. 18 shows a common hand clamp adapted for use with the clamping aid elements in accordance with the present invention.

FIG. 18 shows a common hand clamp, a (locking 'C' clamp) (400), adapted for use with clamping aid elements (420) and (430) of FIG. 19, in accordance with the present invention. The clamping aid elements are pivotally connected to the end of an arm of the hand clamp (400). The hand clamp (400) includes an upper arm (398) and lower arm (399) pivotally connected to one another through a handle portion (395). The handle portion (395) includes a locking mechanism and a second lower handle portion (390), includes a release lever to unlock the clamp. The end of an upper arm (398) includes a pivot bore (382), and the lower arm (399) includes a pivot bore (384), for the clamping aid elements (420) and (430), to pivotally connect and secure to, as are typical swivel head/swivel pad connections.

Alternatively, the clamp arm bore can be threaded or plain and a connecting screw (253) or a connecting screw with nut, respectively, can attach or detach the clamping aid elements from the hand clamp. Various other clamps, such as bar clamps, pipe clamps and regular 'C' clamps, can be adapted to be used together with the clamping aid elements, in accordance with the present invention.

Figure 19A:
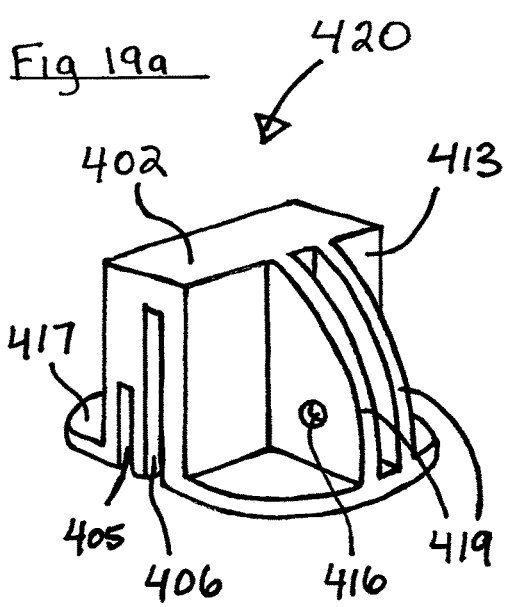
FIGS. 19a and 19b shows an embodiment of a clamping aid element.
Figure 19B:
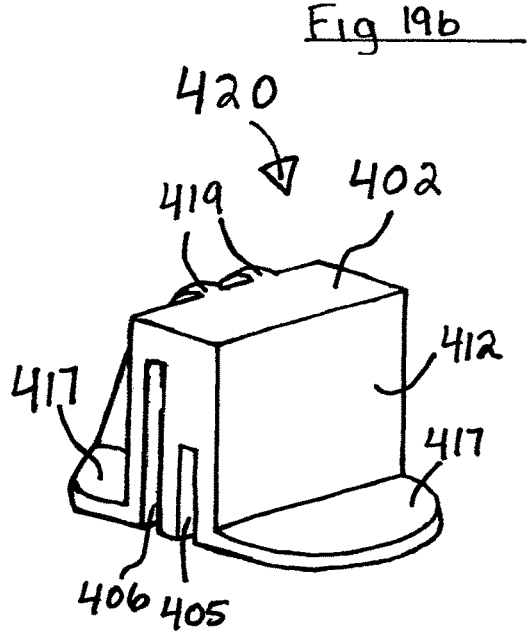

FIGS. 19a and 19b shows a second embodiment of a clamping aid element (420) comprising a channel like body, having a front face (412) a back face (413), a top edge surface (402) and perpendicular pads (417). The back side includes two perpendicular connecting members (419) with pivot (416), that will be pivotally connected to one of the two clamp arms of the hand clamp (400). The clamping aid element (420) includes two slots (405) and (406) with heights of 1 inch and 2 inch, respectively. Slots (405) and (406) are provided for mounting to squares and straight edges. Slot (405) can correspond to one leg of a carpenter square and slot (406) can correspond to one leg of a framing square. The combined hand clamp with clamping aid elements allow quick clamping of either a carpenter square, framing square, or straight edge, when secured to various flat objects.

The slots (405) and (406) are open along the bottom edge surface. The bottom edge surface of the front and back sides include perpendicular pads (417), pointing away from each other, and providing a flat surface area for protecting the surfaces of various objects and materials when clamping.

The third embodiment of a clamping aid element (430), is similar to the second embodiment (420), and like components are given the same reference numbers as in FIGS. 19a and 19b, but with a suffix 'b'.

Figure 19C:
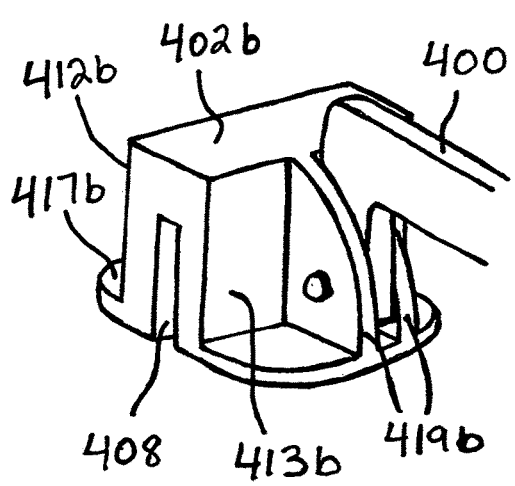
FIGS. 19c and 19d shows a further embodiment of a clamping aid element.
Figure 19D:
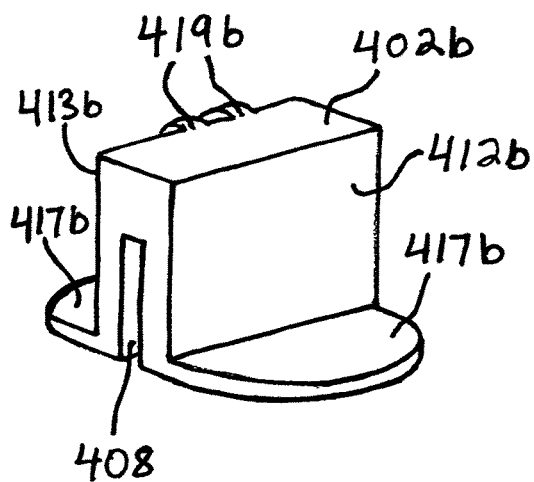

FIGS. 19c and 19d shows a third embodiment of a clamping aid element (430), comprising a channel like body, having a front face (412b) a back face (413b), a top edge surface (402b) and pads (417b). The back side includes two perpendicular connecting members (419b) with pivot (416b), FIG. 19c, shows the clamping aid element (430) that is pivotally connected to one arm of the hand clamp (400) and includes one slot (408) with a height of 1½ inches, that corresponds to a dimension of one of the legs of either a carpenter square or framing square, or a dimension from a straight edge. The combined hand clamp with clamping aid elements allow quick clamping of either a carpenter or framing square to various flat objects.

The slot (408) is open along the bottom edge surface. The bottom edge surface of the front and back sides include perpendicular pads (417b), pointing away from each other, and providing a flat surface area for protecting the surfaces various objects and materials when clamping.

Clamping aid elements (420) and (430) can be mounted to one of the two clamps arms at the same time, or can include one clamping aid element per hand clamp, and the other arm can be adapted with a conventional jaw, comprising of a swivel head with swivel pad.

Various hand clamps, including locking clamps, bar clamps, pipe clamps, regular 'C' clamps, can be adapted with the hand clamp elements of FIGS. 11 and 19. The elements can either be pivotally connected or fixed to the arms of the locking clamps or the jaws of bar clamps, pipe clamps, regular 'C' clamps. The clamping aid elements can also include some or all of the features of the clamping aid tools previously mentioned in FIGS. 1, 2, 6, 7, 16 and 17. Features can include an edge surface, either top and/or bottom, with a 'V' groove, magnets on the edge surface(s), similar to FIG. 11b, and slot(s) open or closed along the bottom edge surface, or a combination of open and closed along the edge surface. Alternatively, the clamping aid elements with slots may be separated from the clamps for independent use.

Figure 20:
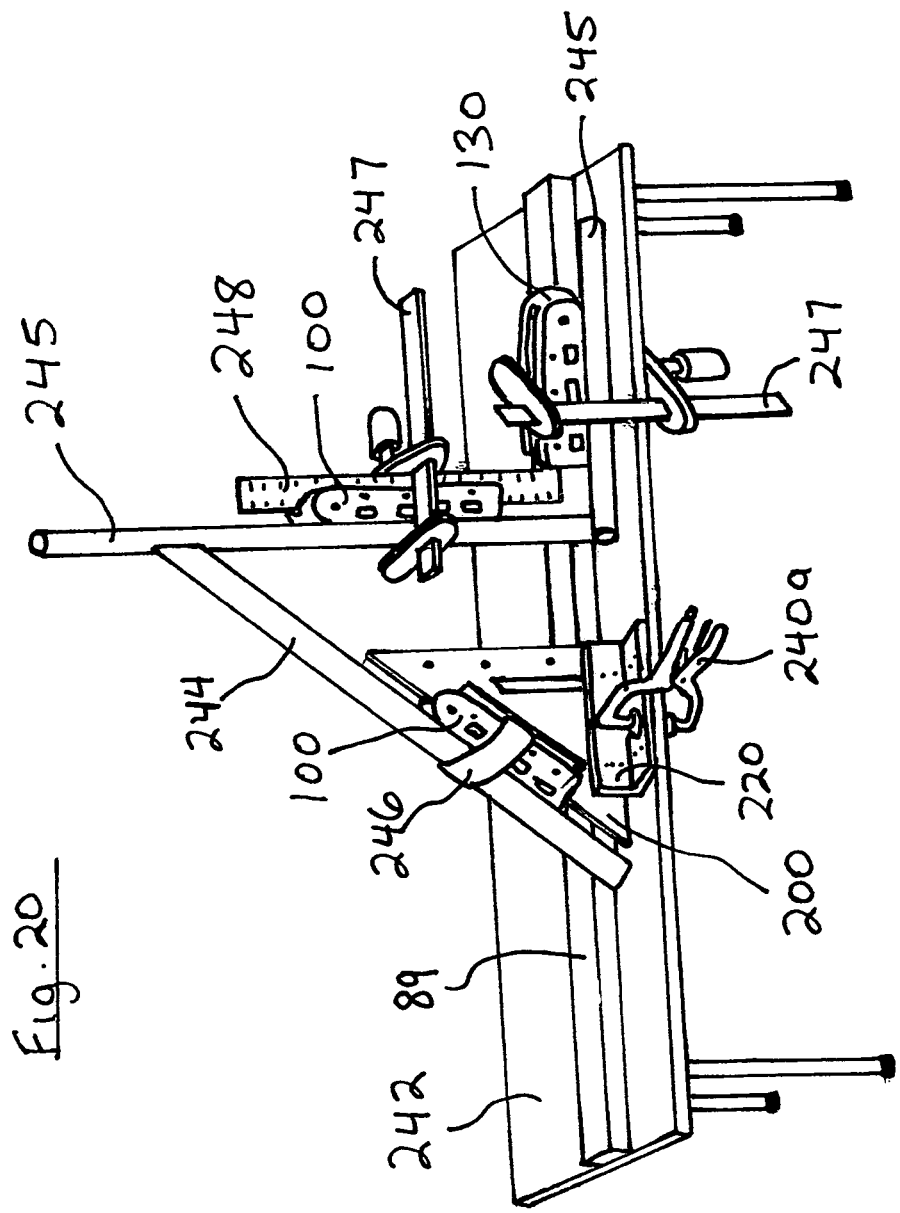
FIG. 20 shows use of various squares, with multiple clamping aid tools with spirit level, component brackets and various common hand clamps in use for aligning and welding of pipes.

FIG. 20 shows the application of various embodiments of the present invention. A triangular square (200) and second component bracket (220) is shown with a locking 'C' clamp (240A) being clamped to a flat bench table (242) or the like. A clamping aid tool with spirit level (100) is mounted to the triangular square (200) on the 45 degrees edge for aligning a pipe section indicated at (244) and secured with magnets along the 'V' groove, and optionally can be secured with the addition of a band strap/ratchet band strap (246). A further pipe section (245) is aligned perpendicular with the bench table (242) by means of a further clamping aid tool (100) secured to the wider leg of the carpenter square (248), to form the other half of the 45 degree pipe joint, and together, along with pipe section (245) are secured with a bar clamp (247). The clamping aid tool with spirit level (130) is secured to the other leg of the carpenter square (248) for aligning a second perpendicular pipe (245), and clamped to the bench table (242) with a second bar clamp (247). A straight edge (89) lays flat on table (242) and helps keep the assembly aligned and centered.

The combination of any of the clamping aid tools, component brackets, various square(s), and various hand clamps, including the hand clamps with clamping aid elements of the present invention, together, can form a jig clamping tool.

The clamping aid tools can include slots of different heights, corresponding to standard dimension from squares and straight edges, including carpenter squares, framing squares, straight edges, rulers and the like. Examples of slot height dimensions can include, a 1 inch, 1½ inch, 2 inch, etc., or other dimensions as may be common in different jurisdictions (e.g. in some countries metric dimensions may be used). The present invention can be easily used by anyone, including pipe fitters, welders, and carpenters, is portable and may be used in either a vertical or horizontal position.

To secure the clamping aid tools to a carpenter square, framing square, speed square, straight edge or rule, mounting screws can be are provided, which can either clamp against the faces of such squares, straight edges or rulers, or can engage corresponding holes or bores in the square itself. Alternatively, some spring mounting arrangement can be provided within each of the elongate slots. The spring(s) can be a spring clip, leaf spring or the like, so that, when a square or straight edge is slid into the slot, it engages the spring(s) which serves to retain the tool in position.

The component brackets can be interchangeably used with various tools of the present invention such as the clamping aid tools and/or triangular square, and allow for easy adjustment of the height of the slots when different size carpenter squares, framing squares, straight edges and/or rulers are used. The component brackets also provide a flange surface for various clamps to easily secure the assembly to various objects. The component brackets combined with the improved triangular square can be used as a corner clamp.

The present disclosure also provides for an angle finder that can easily convert to a variable and/or extendable angle finder. It can comprise of two clamping aid tools (100) and (130), each having i.e. a 1 inch elongate slot along its length. This allows equal size straight edges of 1 inch minimum width to be used to extend the length of the tool and hence the accuracy of the angle finder. It can act as two separate torpedo levels (a level with multiple vials for checking various angles, including vertical, horizontal and 45 degree surfaces or other degrees common in different trade work). It can be used with various component brackets disclosed, to perform various other functions. The center of the 'V' grooves on the top edge surface of the first component bracket when attached to the clamping aid tool of the angle finder can align with the center of the top edge surface 'V' of the other clamping aid tool of the angle finder.

The present invention also provides a hand clamp adapted with clamping aid elements for use with the clamping aid tools of the claimed invention. A jig for clamping can include one or more clamping aid tools for use and mounting with various common tools, including a carpenter square, framing square, speed square, and various straight edges, for easily and accurately positioning various objects, either flat and/or round, magnetic or not. The clamping aids can easily clamp such a square to round pipes at correct angles while being fitted, secured and/or welded together that may be difficult or impossible to do. The square can be clamped for most or all of the process to increase accuracy and efficiency of the work, prevent errors and save money. The claimed invention as a whole, is a versatile tool or jig, that can be used in many different arrangements and replace several tools such as a corner clamp, a variable and/or extendable angle finder, a speed square, a welders magnet, a torpedo level/extended level, a 'T' square, a Try square, a depth gauge, a combination square, etc.

The clamping aid tools can be made of any suitable material or alloy metal that is durable, including aluminum, steel and or hard plastic or a combination of materials. As an example the main body will preferably be aluminum, and any clamping aid tools with a level feature will include spirit vials made of typical construction.

The triangular square and alternative speed square can be made of traditional materials, such as aluminum or hard plastic, but most likely of a durable aluminum material such as aircraft aluminum would be ideal.

The component bracket can be of various metal alloy material but again, most likely of very strong aluminum;

The various hand clamps can be made of various materials or a combination of various materials, depending on the type of hand clamp. Various hand clamps can be adapted with a clamping aid element(s), and the element(s) can include some or all of the features of the clamping aid tools of the present invention. These clamps can include various locking clamps, bar clamps, regular 'C' clamps, pipe clamps, etc.

Magnets included in accordance with the present invention can include earth magnets, ceramic or other suitable material.

Mounting screws can be made from a metal alloy, including brass which may be non-marring.

While embodiments of the invention have been described in the detailed description, the scope of the claims should not be limited by the preferred embodiments set forth in the examples, but should be given the broadest interpretation consistent with the description as a whole.

What is claimed:
1. A clamping aid tool, comprising:
at least one body, the body having:
   side surfaces,
   end surfaces,
   a top edge surface,
   a bottom edge surface opposed to the top edge surface, and
   an elongate slot for mounting to a hand tool;
wherein, in the body,
   the end surfaces are flat;
   the top edge surface including a 'V' groove extending the full length of the body and configured to align a round object;
   the bottom edge surface is generally flat for use with flat objects;
   the elongate slot extending the full length of the body for receiving a hand tool;
   wherein the hand tool is one selected from a group comprising 'L' squares, straight edges, straight edge rulers, or the like, to form various tools uses, such as a clamping aid jig or depth gauge tool;
   a plurality of slots in the body; wherein the plurality of slots includes the elongate and an additional slot in the body;
   a plurality of threaded mounting holes at both side surfaces of the body at the elongate slot, the mounting holes extending through the body to the opposing side surfaces of the body, the mounting holes for use with mounting screws for securing and/or positioning a hand tool inserted in the elongate slot;
   a plurality of mounting screws for use with the plurality of mounting holes; and
   wherein a hand clamp can be used at the clamping aid body to secure the tool assembly when aligning and/or securing a flat or round object that abuts a corresponding bottom or top edge surface of the clamping aid body.

2. A clamping aid tool of claim 1, wherein the additional slot of the plurality of slots is perpendicular to the elongate slot, the perpendicular slot extending from the top edge surface to the bottom edge surface, the perpendicular slot shaped to receive a straight edge tool to form an adjustable 'T' square with the body;
   wherein the perpendicular slot may be independent of the elongate slot; and
   wherein a mounting hole and screw of the plurality of mounting holes and screws is provided at the perpendicular slot for securing the straight edge tool.

3. A clamping aid tool of claim 2, wherein the additional slot of the plurality of slots includes a second elongate slot, the second elongate slot extending the full length of the body for receiving an additional hand tool from the group of hand tools; and
   wherein the plurality of mounting holes and screws at one or both side surfaces of the body can secure an additional hand tool inserted in the second elongate slot.

4. A clamping aid tool of claim 2, further comprising:
   one or more straight edges as the hand tool, the one or more straight edges for use with one or more of the plurality of slots to form various tools, such as a depth gauge an adjustable 'T' square, or a clamping aid jig; and wherein the straight edge is a plain straight edge or a straight edge ruler.

5. A clamping aid tool of claim 4, further comprising:

at least one component bracket, the component bracket is 'L' shaped having, rows of mounting holes in both perpendicular surfaces, each row of mounting holes in both perpendicular surfaces aligning with the mounting holes of the at least one clamping aid body;

wherein the component bracket is for securing to a side surface of the clamping aid body;

wherein the rows of mounting holes of one perpendicular surface allow the component bracket to be mounted to extend across the bottom edge surface of the clamping aid body;

wherein the mounting holes of the other perpendicular surface allows the component bracket to be mounted flush with the bottom edge surface of the clamping aid body and/or a hand tool inserted in the elongate slot;

wherein the rows of mounting holes allow the component bracket to be adjustable to accommodate hand tools of different heights within-inserted in the elongate slot; and wherein a hand clamp can additionally be used to clamp a component bracket secured to the clamping aid body to an object.

6. A clamping aid tool of claim 2, further comprising:

at least one component bracket, the component bracket is 'L' shaped having:

rows of mounting holes in both perpendicular surfaces, each row of the mounting holes in both perpendicular surfaces aligning with the mounting holes of the at least one clamping aid body;

wherein the component bracket is for securing to a side surface of the clamping aid body:

wherein the rows of mounting holes of one perpendicular surface allow the component bracket to be mounted to extend across the bottom edge surface of the clamping aid body;

wherein the mounting holes of the other perpendicular surface allows the component bracket to be mounted flush with the bottom edge surface of the clamping aid body and/or a hand tool inserted in the elongate slot;

wherein the rows of mounting holes allow the component bracket to be adjustable to accommodate hand tools of different heights inserted in the elongate slot; and wherein a hand clamp can additionally be used to clamp a component bracket secured to the clamping aid body to an object.

7. A clamping aid tool of claim 1, wherein the additional slot of the plurality of slots includes a second elongate slot, the second elongate slot extending the full length of the body and shaped to receive an additional hand tool from the group of hand tools; and wherein the plurality of mounting holes and screws at one or both side surfaces of the body can secure an additional hand tool inserted in the second elongate slot.

8. A clamping aid tool of claim 7, wherein the elongate slots are of the same height.

9. A clamping aid tool of claim 7, wherein the elongate slots are of different heights; and wherein the elongate slots can be either open, closed or a combination of open and closed along the bottom edge surface.

10. A clamping aid tool of claim 7, further comprising:

a second body including two elongate slots; wherein the body and the second body further including flanges extending from both ends and perpendicular to one side of clamping aid body, both flanges of each body having matching 'V' grooves perpendicular to the top and bottom edge surfaces the matching 'V' grooves for aligning a round object.

11. A clamping aid tool of claim 7, further comprising:

a sleeve housing at the top of each elongate slot extending the full length of the slot, the sleeve housing for use with a sleeve insert;

a sleeve insert for adjusting the height of each elongate slot for use with a hand tool having a different dimensions.

12. The clamping aid tool of claim 1, further comprising:

one or more spirit vials provided above the elongate slot, each spirit vial of the one or more spirit vials may be parallel or at an angle to the elongate slot to additionally form a leveling tool for aligning various objects at various angles;

wherein each spirit vial can be viewed from both sides of the body; and wherein the elongate slot is either open or closed along the bottom edge surface.

13. A clamping aid tool of claim 1, wherein the height of the elongate slot corresponds to a dimension of one leg of an 'L' square tool; and wherein the clamping aid body can be mounted with either the top or bottom edge surface positioned on the outside or inside edge of the 'L' square, the top edge surface of the body for aligning a round object and the bottom edge surface of the body for aligning a flat object.

14. A clamping aid tool of claim 13, further comprising:

a second body including an elongate slot;

wherein the elongate slot height of the second body corresponds to a dimension of the other leg of the 'L' square tool;

wherein the second body can additionally be mounted to the other leg of the 'L' square with either the top or bottom edge surface positioned on the outside or inside edge of the 'L' square, the second body to additionally align a flat or round object abutting the corresponding bottom or top edge surface of the second body;

wherein the center of the 'V' groove of the at least one body aligns with the center of the 'V' groove of the second body when both bodies are mounted or positioned to the 'L' square; and wherein an additional hand clamp can be used at the second body to secure to the clamping aid tool when aligning and/or securing a flat or round object that abuts a corresponding bottom or to edge surface of the second clamping aid body.

15. A clamping aid tool of claim 14, wherein the 'L' square tool is a carpenter square.

16. A clamping aid tool of claim 15, further comprising:

magnets along each 'V' groove for securing to a ferromagnetic object.

17. A clamping aid tool of claim 16, wherein the carpenter square further includes mounting holes in the body, the mounting holes centered along each leg of the carpenter square for aligning with the mounting holes of a corresponding one of the at least one and second bodies when inserted and positioned in the corresponding elongate slot of each body; and wherein the mounting holes and screws of each body can secure the carpenter square to each body.

18. A clamping aid tool of claim 16, wherein the elongate slot of the at least one and second bodies is closed along the bottom edge surface is closed.

19. A clamping aid tool of claim 1, wherein the additional slot of the plurality of slots in the at least one body includes a second elongate slot extending the full length of the body; and wherein the elongate slots can include a height of either 1 inch, 1.5 inches or 2 inches, or any combination of these dimensions.

20. A clamping aid tool comprising:
   at least one body having:
      side surfaces;
      end surfaces;
      a top edge surface comprising a V groove extending the full length of the body for use with and aligning a round object;
      a bottom edge surface opposed to the top edge surface; and
      at least on elongate slot for mounting to a hand tool;
   wherein the top edge surface is generally flat, the bottom edge surface is generally flat, the elongate slot extending the full length of the body for receiving a hand tool;
   wherein the hand tool can include a hand tool from a group comprising 'L' squares, straight edges, straight edge rulers, or the like, to form, various tools uses such as a clamping aid jig or depth gauge tool;
   a plurality of slots, the plurality of slots including the elongate slot and a perpendicular slot, the perpendicular slot extending from the top edge surface to the bottom edge surface and shaped to receive a straight edge tool;
   one or more spirit vials in the body above the elongate slot, each of the one or more spirit vials may be parallel or at an angle to the elongate slot to additionally form a leveling tool for aligning various objects at various angles;
   wherein each spirit vial can be viewed from both sides of the body;
   magnets provided on the top edge surface, centered along the V groove for use with a ferromagnetic object;
   a plurality of threaded mounting holes at both sides surface of the body at the elongate slot, the mounting holes extending through the body to the opposing side surface of the body;
   wherein one mounting hole of the plurality of mounting holes is provided at the perpendicular slot;
   wherein the mounting holes are for use with mounting screws for securing and/or positioning a hand tool inserted in any of the plurality of slots;
   a plurality of mounting screws for use with the plurality of mounting holes; and
   wherein a hand clamp can be used at the clamping aid body to secure the tool assembly when aligning and/or securing a flat or round object that abuts a corresponding bottom or top edge surface of the clamping aid body.

21. A clamping aid tool of claim 20, further comprising:
   at least one straight edge tool as the hand tool;
   the straight edge tool for use with any of the plurality of slots;
   wherein the straight edge inserted and secured in the elongate slot forms a depth gauge tool or extendable level;
   wherein the straight edge inserted and secured in the perpendicular slot forms an adjustable 'T' square; and
   wherein the straight edge is a plain straight edge or a straight edge ruler.

22. A clamping aid tool of claim 21, further comprising:
   a second perpendicular slot in the end surface for use with a common combination square ruler, the second perpendicular slot extending from the to edge surface to the bottom edge surface;
   a first opening in the clamping aid body extending through to both side surfaces of the body above the elongate slot and near the second perpendicular slot;
   a second perpendicular opening, the second perpendicular opening extending from the first opening and into the second perpendicular slot in the end surface, the second perpendicular opening shaped to correspond with the tool mounting hardware of commonly known combination square tool;
   wherein the first perpendicular opening and the second perpendicular opening for receiving and retaining the tool mounting hardware;
   a tool mounting hardware for a common combination square tool including a connecting screw and securing nut;
   a common combination square ruler including a groove along the body for use with the tool mounting hardware; and
   wherein the tool mounting hardware engages the groove on the common combination square ruler inserted in the second perpendicular slot and secures the ruler in the end surface to form the combination square tool.

23. A clamping aid tool of claim 21, further comprising:
   one or more spirit level vials in the body above the elongate slot, each spirit vial of the one or more spirit vials may be parallel or at an angle to the elongate slot to additionally form a leveling tool for aligning various objects at various angles;
   wherein each spirit vial can be viewed from both sides of the body; and
   wherein a straight edge tool inserted in any of the plurality of slots forms an extended level tool.

24. A clamping aid tool of claim 20,
   wherein the plurality of slots further includes a second elongate slot, the second elongate slot extending the full length of the clamping aid body, the second elongate slot for use with a hand tool from the group of hand tools; and
   wherein the plurality mounting holes and screws at one or both side surfaces of the body can secure an additional hand tool inserted in the second elongate slot.

25. A multi-tool comprising:
   at least two clamping aid bodies, each body having:
      side surfaces,
      end surfaces,
      a top edge surface,
      a bottom edge surface opposed to the top edge surface,
      a pivot bore and
      at least one elongate slot for mounting to a hand tool;
   wherein, in each of the at least two bodies:
      one end surface is round and an opposing end surface is flat;
      the top edge surface is generally flat;
      the bottom edge surface is generally flat;

the elongate slot extends the full length of the clamping aid body, and shaped to receive a hand tool;

wherein the hand tool received in each clamping aid body is one selected from a group comprising 'L' squares, straight edges, straight edge rulers, or the like, to form various tools uses, such as a clamping aid jig, or depth gauge tool etc;

wherein each pivot bore extends through a respective one of the bodies;

wherein each pivot bore is provided at the rounded end of a respective one of the bodies; and above the elongate slot;

a securing device included with each body for securing a hand tool inserted each elongate slot;

a mounting hardware including a connecting screw and a locking nut, the connecting screw having a head, a shank (body), and a threaded portion, the mounting hardware for pivotally connecting the two bodies through the two pivot bores to additionally form an angle finder;

wherein one or both bodies of the angle finder can be used in combination with a straight edge in each elongate slot to form a variable and extendable angle finder or depth gauge tool;

wherein the extendable depth gauge tool is formed when the angle finder is folded or rotated to a closed position, with the two flat end surfaces of each body parallel with each other;

wherein the mounting hardware can easily be removed for separating the two connected bodies of the angle finder; and wherein a hand clamp can be used at each clamping aid body to secure the tool assembly when aligning and/or securing a flat or round object that abuts a corresponding bottom or top edge surface of each clamping aid body.

26. A multi-tool of claim 25, further comprising:
one or more spirit level vials in one or both bodies of the at least two bodies above the elongate slot, each of the one or more spirit vials in each body may be parallel or at an angle to the elongate slot to additionally form a leveling tool for aligning various objects at various angles;

wherein each spirit vial can be viewed from both sides of each body; and wherein a straight edge tool inserted in each elongate slot of one or both bodies either separated or connected together, can additionally form a longer or extendable level.

27. A multi-tool of claim 26, further comprising:
a perpendicular slot in the end surface of one of the at least two bodies, the perpendicular slot extending from the top edge surface to the bottom edge surface for use with a hand tool from the group of hand tools;

and wherein a mounting hole and mounting screw is provided at the perpendicular slot for securing the hand tool.

28. A multi-tool of claim 25, further comprising:
a plurality of slots in at least one of the two bodies, the plurality of slots including the elongate slot and an additional slot.

29. A multi-tool of claim 28, wherein at least one slot of the plurality of slots is perpendicular to the elongate slot, the perpendicular slot extending from the top edge surface to the bottom edge surface, the perpendicular slot shaped to receive a straight edge tool to form an adjustable 'T' square with the body;

wherein the perpendicular slot may be independent of the elongate slot; and wherein the securing device is additionally provided at the perpendicular slot for securing a straight edge tool.

30. A multi-tool of claim 29, wherein the securing device comprises:
a plurality of threaded mounting holes, at both sides surfaces of each body at the elongate slot, the mounting holes extending through each body to the opposing side surfaces of each body, wherein one of the mounting holes is positioned at the perpendicular slot, the mounting holes for use with mounting screws for securing a hand tool to inserted in the elongate slot and perpendicular slot; and a plurality of mounting screws for use with the plurality of mounting holes.

31. A multi-tool of claim 30, further comprising:
magnets on at least one of the edge surfaces for use with ferromagnetic objects.

32. A multi-tool of claim 31, further comprising:
a circular protractor on one of the at least two bodies, the protractor provided on one or both side surfaces of the body at the rounded end, the protractor including degree markings ranging anywhere from 0-360 degrees;

wherein one of the pivot bores has a round opening and the other pivot bore has a square opening;

wherein the round pivot bore opening is provided with the clamping aid boy that includes the protractor;

wherein the body of the connecting screw further includes a round shaped portion and a square shaped portion, the round shaped portion located below the screw head for mating with the round pivot bore opening of one clamping aid body, and the square shaped portion for mating with the square pivot bore opening of the other clamping aid body;

wherein in the connecting screw further includes a degree indicator on the head of the connecting screw for indicating the degree or angle on the protractor; and wherein the clamping aid body with the square pivot bore rotates the connecting screw when the assembled angle finder is operated.

33. A multi-tool of claim 32, further comprising:
a 'V' groove on the top edge surface of each of the at least two bodies extending the full length of each body for aligning a round object;

wherein each 'V' groove may be centered with the center of each elongate slot;

wherein the magnets are provided on the top edge surface along the 'V' groove; and wherein the one or both elongate slots may be open along the bottom edge surface for additionally mounting other hand tools, including a speed square.

34. A multi-tool of claim 33, further comprising:
a second perpendicular slot in the end surface for use with a common combination square ruler, the second perpendicular slot extending from the top edge surface to the bottom edge surface, the second perpendicular slot provided in the body including the other perpendicular slot of the at least two bodies;

a first opening in the clamping aid body extending through to both side surfaces of the body above the elongate slot and near the second perpendicular slot;

a second perpendicular opening, the perpendicular opening extending from the first opening and into the second perpendicular slot in the end surface, the second perpendicular opening shaped to correspond with the tool mounting hardware of a commonly known combination square tool;
wherein the first perpendicular opening and the second perpendicular opening for receiving and retaining the mounting hardware;
a tool mounting hardware for a common combination square tool;
a common combination square ruler including a groove along the body for use with the tool mounting hardware; and
wherein the tool mounting hardware engages the groove on the common combination square ruler inserted in the second perpendicular slot and secures the ruler in the end surface to form the combination square tool.

35. A multi-tool of claim 33, further comprising:
one or more straight edge tools as the hand tool, the one or more straight edges for use with one or more of the plurality of slots to form various tool uses, such as a variable or extendable angle finder, depth gauge, extendable level, adjustable 'T' square, or a clamping aid jig; and
wherein the one or more straight edges may be plain or a straight edge ruler.

36. A multi-tool of claim 33, further comprising:
a locking device for locking the two connected bodies or angle finder in a folded and closed position; and
wherein the elongate slot of each body can include a height of 1 inch.

37. A multi-tool of claim 29, wherein the securing device comprises:
a plurality of threaded mounting holes, at both sides surfaces of each of the at least two bodies at the elongate slot, the mounting holes extending through the body to the opposing side surfaces of each body, the mounting holes for use with mounting screws for securing a hand tool inserted in the elongate slot; and
a plurality of mounting screws for use with the plurality of mounting holes.

38. A multi-tool of claim 37, further comprising:
a circular protractor on one of the at least two bodies, the protractor provided on one or both side surfaces of the body at the rounded end, the protractor including degree markings ranging anywhere from 0-360 degrees;
wherein one of the pivot bore opening has a round opening and the other pivot bore has a square opening;
wherein the round pivot bore opening is provided with the clamping aid body that includes the protractor;
wherein the body of the connecting screw further includes a round shaped portion and a square shaped portion, the round shaped portion located below the screw head for mating with the round pivot bore of one clamping aid body, and the square shaped portion for mating with the square pivot bore of the other clamping aid body;
wherein the connecting screw further includes a degree indicator on the head of the connecting screw for indicating a degree or angle on the protractor;
wherein the clamping aid body with the square pivot bore rotates the connecting screw when the assembled angle finder is operated.

39. A multi-tool of claim 37, wherein:
the additional slot of the plurality of slots includes a second elongate slot, the second elongate slot extending the full length of the body, the second elongate slot shaped to receive an additional hand tool from the group of hand tools;
wherein the plurality of mounting holes and screws at one or both side surface of the at least one body can secure an additional hand tool inserted in the second elongate slot; and
wherein the each of the elongate slots of the clamping aid body can have a height of 1 inch, 1.5 inches or 2 inches, or any combination of these dimensions.

40. A multi-tool of claim 25, further comprising:
magnets provided on at least one of the edge surfaces of each of the at least two bodies for use with ferromagnetic objects.

41. A multi-tool of claim 40, further comprising:
a 'V' groove on the top edge surface of each body of the at least two bodies, the 'V' groove extending the full length of each body for aligning a round object;
and wherein the magnets of each body are provided on the top edge surface along the 'V' groove.

42. A multi-tool of claim 25, further comprising:
a circular protractor on one of the at least two bodies, the protractor provided on one or both side surfaces of the body at the rounded end, the protractor including degree markings ranging anywhere from 0-360 degrees;
wherein one of the pivot bores has a round opening and the other pivot bore has a square opening;
wherein the round pivot bore opening is provided with the clamping aid body that includes the protractor;
wherein the body of the connecting screw further includes a round shaped portion and a square shaped portion, the round shaped portion located below the screw head for mating with the round pivot bore opening of one clamping aid body, and the square shaped portion for mating with the square are pivot bore opening of the other clamping aid body;
wherein in the connecting screw further includes a degree indicator on the head of the connecting screw for indicating the degree or angle on the protractor; and
wherein the clamping aid body with the square pivot bore rotates the connecting screw when the assembled angle finder is operated.

43. A multi-tool of claim 25, further comprising:
of one or more straight edge tools as the hand tool,
the one or more straight edges for use with one or both of the at least two bodies,
the one or more straight edges for use with each elongate slot to form various tool uses, such as a depth gauge, a variable/adjustable angle finder or a clamping aid jig; and
wherein the straight edge can be a plain straight edge or straight edge ruler.

44. A multi-tool of claim 25, wherein the elongate slot of each of the at least two bodies can be open along the bottom edge surface for mounting an additional hand tool, such as a speed square.

45. A multi-tool comprising:
at least two clamping aid bodies, each body having:
side surfaces,
end surfaces,
a top edge surface,
a bottom edge surface opposed to the top edge surface,
a pivot bore, and
at least one elongate slot for mounting to a hand tool;
wherein in each clamping aid body;
one end surface is round and the opposing end is flat;
the top edge surface has a 'V' groove extending the length of the body and configured to align a round object;

the bottom edge surface is generally flat;
the elongate slot extending the full length of the body,
and shaped to receive a hand tool;
wherein the hand tool is one selected from a group comprising various 'L' squares, straight edges, rulers, or the like, to form various tools, such as a clamping aid jig, or depth gauge tool;
each pivot bore extending through a respective one of the bodies, each pivot bore provided at one end of a respective one of the bodies and above the elongate slot;
a securing device included with each body for securing a hand tool inserted in the elongate slot of each body;
a mounting hardware including at least a connecting screw and a locking nut, the connecting screw having a head, a shank (body), and a threaded portion, the mounting hardware for pivotally connecting the two bodies through the two pivot bores; and
wherein the mounting hardware can be connected to the two bodies to form an angle finder tool or a variable and extendable angle finder or extendable depth gauge tool when a straight edge is inserted in the elongate slot of either one or both bodies;
wherein the mounting hardware can be removed for separating two connected bodies of a formed angle finder for different tool uses, such as a clamping aid jig for clamping a carpenter square, framing square, straight edge or the like, when aligning various objects; and
wherein a hand clamp can be used at each clamping aid body to secure the tool assembly when aligning and/or securing a flat or round object that abuts a corresponding bottom or top edge surface of each clamping aid body.

46. A multi-tool of claim 45, further comprising:
a circular protractor provided on one or both side surfaces of one of the at least two bodies at the rounded end, the protractor including degree markings ranging anywhere from 0-360 degrees;
wherein one of the pivot bores has a round opening and the other pivot bore has a square opening;
wherein the round pivot bore opening is provided with the clamping aid body that includes the protractor;
wherein the body of the connecting screw further includes a round shaped portion and a square shaped portion, the round shaped portion located below the screw head for mating with the round pivot bore opening of one clamping aid body, and the square shaped portion for Mating with the square pivot bore opening of the other clamping aid body;
wherein in the connecting screw further includes a degree indicator on the head of the connecting screw for indicating the degree or angle on the protractor; and
wherein the clamping aid body with the square pivot bore rotates the connecting screw when the assembled angle finder is operated.

47. A multi-tool of claim 46, further comprising:
an additional slot in at least one of the at least two bodies perpendicular to the elongate slot, the perpendicular slot extending from the top edge surface to the bottom edge surface and shaped to receive a straight edge tool to form an adjustable 'T' square with the body;
wherein the securing device includes a plurality of threaded mounting holes at both sides surfaces of each body at the elongate slot, the mounting holes extending through each body to the opposing side surfaced of each body;
wherein one of the mounting holes is positioned at the perpendicular slot, the mounting holes for use with mounting screws for securing a hand tool inserted in the elongate slot and perpendicular slot;
a plurality of mounting screws for use with the plurality of mounting holes; and
wherein the perpendicular slot may be independent of the elongate slot.

48. A multi-tool of claim 47, further comprising:
one or more spirit level vials in one or both of the at least two bodies above the elongate slot, each of the one or more spirit vials in each body may be parallel or at an angle to the elongate slot to additionally form a leveling tool for aligning various objects at various angles;
wherein each spirit vial can be viewed from both sides of the body; and
wherein a straight edge tool inserted in each elongate slot of one or both bodies, either separated or connected together can additionally be form a longer or extendable level,
wherein the securing device comprises a plurality of threaded mounting holes, positioned at the elongate slot at both sides surfaces of each body, mounting holes for use with mounting screws for securing a respective hand tool in each elongate slot and perpendicular slot; and
a plurality of mounting screws for use with the plurality of mounting holes.

\* \* \* \* \*